US 12,291,799 B2

(12) United States Patent
Cascio et al.

(10) Patent No.: US 12,291,799 B2
(45) Date of Patent: May 6, 2025

(54) SYSTEMS AND METHODS FOR PRODUCING A BUNDLE OF FILAMENTS AND/OR A YARN

(71) Applicant: Aladdin Manufacturing Corporation, Calhoun, GA (US)

(72) Inventors: Anthony Cascio, Calhoun, GA (US); James Mason, Summerville, GA (US); Daniel Amos, Dalton, GA (US); Lucinda Jones, Calhoun, GA (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 905 days.

(21) Appl. No.: 17/349,731

(22) Filed: Jun. 16, 2021

(65) Prior Publication Data
US 2021/0388531 A1    Dec. 16, 2021

Related U.S. Application Data

(60) Provisional application No. 63/039,637, filed on Jun. 16, 2020, provisional application No. 63/039,626, filed on Jun. 16, 2020.

(51) Int. Cl.
*D01D 5/08*    (2006.01)
*B29C 48/345*    (2019.01)
(Continued)

(52) U.S. Cl.
CPC .......... *D01D 5/082* (2013.01); *B29C 48/345* (2019.02); *D01D 4/025* (2013.01); *D01D 5/28* (2013.01);
(Continued)

(58) Field of Classification Search
CPC ............ D01D 1/06; D01D 1/065; D01D 1/09; D01D 4/025; D01D 4/06; D01D 5/082;
(Continued)

(56) References Cited

U.S. PATENT DOCUMENTS 3,930,782 A    1/1976   Bigland
4,112,561 A    9/1978   Norris et al.
(Continued)

FOREIGN PATENT DOCUMENTS

CA    2256050 A1    6/1999
GB    1275572 A     5/1975
(Continued)

OTHER PUBLICATIONS

International Search Report and Written Opinion issued in PCT/US2021/037684, dated Nov. 1, 2021.
(Continued)

*Primary Examiner* — Xiao S Zhao
*Assistant Examiner* — Joseph S Leyson
(74) *Attorney, Agent, or Firm* — Meunier Carlin & Curfman LLC

(57) ABSTRACT

Systems for producing M yarns, wherein M≥1, include N extruders, M spin stations, and a processor, wherein N>1. Each extruder includes a thermoplastic polymer having a color, hue, and/or dyability characteristic, which are different from each other. Each spin station produces one yarn comprising at least one bundle of filaments. Each spin station comprises at least one spinneret through which filaments are spun from at least two molten thermoplastic polymer streams received by the respective spin station and N spin pumps upstream of the spinneret for the respective spin station. Each spin pump is paired with one of the N extruders. The processor is in electrical communication with the N*M spin pumps and is configured to adjust the volumetric flow rate of the polymers pumped from each spin pump to achieve a ratio of the polymers to be included in each M yarn.

12 Claims, 13 Drawing Sheets

(51) Int. Cl.
  *D01D 4/02* (2006.01)
  *D01D 5/28* (2006.01)
  *D01D 13/00* (2006.01)
  *B29L 31/00* (2006.01)

(52) U.S. Cl.
  CPC ........ *D01D 13/00* (2013.01); *B29C 2948/926* (2019.02); *B29L 2031/707* (2013.01)

(58) Field of Classification Search
  CPC .. D01D 5/28; D01D 5/30; D01D 5/32; D01D 5/34; D01D 5/36; D01D 13/00; B29C 48/345
  See application file for complete search history.

(56) References Cited

U.S. PATENT DOCUMENTS

| | | |
|---|---|---|
| 4,216,735 A | 8/1980 | McDaniel |
| 4,708,619 A | 11/1987 | Balk |
| 4,789,507 A | 12/1988 | Wesley et al. |
| 5,131,918 A | 7/1992 | Kelley |
| 5,160,347 A | 11/1992 | Kay et al. |
| 5,234,650 A | 8/1993 | Hagen et al. |
| 5,362,563 A | 11/1994 | Lin |
| 5,549,957 A | 8/1996 | Negola et al. |
| 5,834,089 A | 11/1998 | Jones et al. |
| 5,902,531 A | 5/1999 | Berger et al. |
| 5,958,548 A | 9/1999 | Negola et al. |
| 5,996,328 A | 12/1999 | King et al. |
| 6,076,345 A | 6/2000 | Weiss et al. |
| 6,085,395 A | 7/2000 | Weiss |
| 6,113,825 A | 9/2000 | Chuah |
| 6,119,320 A * | 9/2000 | Weiss ................. D02J 1/08 28/271 |
| 6,257,512 B1 | 7/2001 | Schoeck et al. |
| 6,383,432 B1 | 5/2002 | Nakajima et al. |
| 6,406,650 B1 | 6/2002 | Gross et al. |
| 6,900,547 B2 | 5/2005 | Polk, Jr. et al. |
| 7,086,130 B2 | 8/2006 | Jahns et al. |
| 7,651,540 B2 | 1/2010 | Rao |
| 7,845,923 B2 | 12/2010 | Lennemann |
| 8,182,550 B1 | 5/2012 | Hayes |
| 8,597,553 B1 | 12/2013 | Clark |
| 9,550,338 B2 | 1/2017 | Clark |
| 2002/0073684 A1 | 6/2002 | Simmen |
| 2005/0008855 A1 | 1/2005 | Figuly et al. |
| 2005/0048253 A1 | 3/2005 | Nord et al. |
| 2005/0048281 A1 | 3/2005 | Royer et al. |
| 2005/0106391 A1 | 5/2005 | Lawrence et al. |
| 2006/0049542 A1 | 3/2006 | Chu et al. |
| 2006/0144033 A1 | 7/2006 | Lee |
| 2009/0208695 A1 | 8/2009 | Funatsu et al. |
| 2010/0256319 A1 | 10/2010 | Pereira De Lacerda et al. |
| 2010/0297442 A1 | 11/2010 | Kalies et al. |
| 2012/0034838 A1 | 2/2012 | Li et al. |
| 2013/0200544 A1* | 8/2013 | Hahm ................. D01D 5/28 264/103 |
| 2013/0315029 A1 | 11/2013 | Helbing et al. |
| 2015/0275400 A1 | 10/2015 | Tung |
| 2018/0363239 A1 | 12/2018 | Love et al. |
| 2019/0085483 A1 | 3/2019 | Clark |
| 2019/0105283 A1 | 4/2019 | Anderson et al. |
| 2019/0315962 A1 | 10/2019 | Booth et al. |
| 2019/0360129 A1 | 11/2019 | Nasri et al. |
| 2020/0102698 A1 | 4/2020 | Lu |
| 2020/0115824 A1 | 4/2020 | Stündl et al. |
| 2020/0291547 A1 | 9/2020 | Fischer et al. |
| 2020/0324454 A1 | 10/2020 | Sauer |
| 2021/0388539 A1 | 12/2021 | Cascio et al. |
| 2021/0388540 A1 | 12/2021 | Cascio et al. |

FOREIGN PATENT DOCUMENTS

| | | |
|---|---|---|
| JP | 3088597 B2 | 4/1995 |
| JP | 2005060850 A | 3/2005 |
| WO | 1995014806 A1 | 6/1996 |
| WO | 2001073189 A1 | 10/2001 |
| WO | 2007121696 A1 | 11/2007 |
| WO | 2009037118 A1 | 3/2009 |
| WO | 2015039971 A1 | 3/2015 |
| WO | 2020123127 A1 | 6/2020 |
| WO | 2021257733 A1 | 12/2021 |
| WO | 2021257738 A1 | 12/2021 |

OTHER PUBLICATIONS

International Search Report and Written Opinion issued in PCT/US2021/037673, dated Nov. 9, 2021.
International Search Report and Written Opinion issued in PCT/US2021/037687, dated Nov. 1, 2021.
Terry, BCF—Bulk Continuous Filament Carpet Fiber, Feb. 5, 2018, [retrieved from the Internet on Aug. 2, 2021 at <https://www.baneclene.com/professionals/Content.aspx?xps=NTY1>] para 1.
International Search Report and Written Opinion issued in PCT/US2019/062873, dated Feb. 7, 2020.
Extended European Search Report completed Jul. 15, 2019 in related European application EP 19152387.7 (7 pages).
International Search Report and Written Opinion issued in PCT/US2021/063605, mailed Mar. 8, 2022, 15 pages.
Non Final Office Action issued in co-pending U.S. Appl. No. 17/349,699, mailed Aug. 17, 2023, 17 pages.
Non Final Office Action issued in co-pending U.S. Appl. No. 17/349,696, mailed Sep. 7, 2023, 10 pages.
Non-Final Office Action issued in U.S. Appl. No. 17/349,696, mailed Mar. 14, 2024.
International Search Report and Written Opinion issued in PCT/US2022/026128, mailed Jul. 29, 2022 (8 pages).
Non-FInal Office Action mailed on May 16, 2024, in U.S. Appl. No. 17/413,356.
Non-Final Office Action issued in U.S. Appl. No. 17/349,696, mailed Nov. 8, 2024.

* cited by examiner

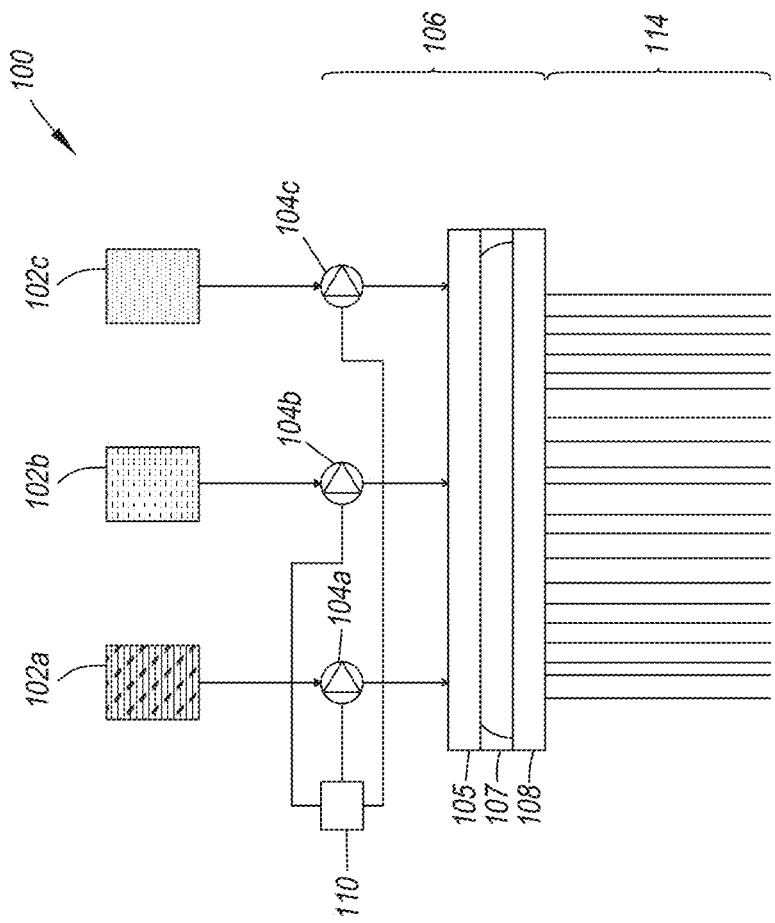

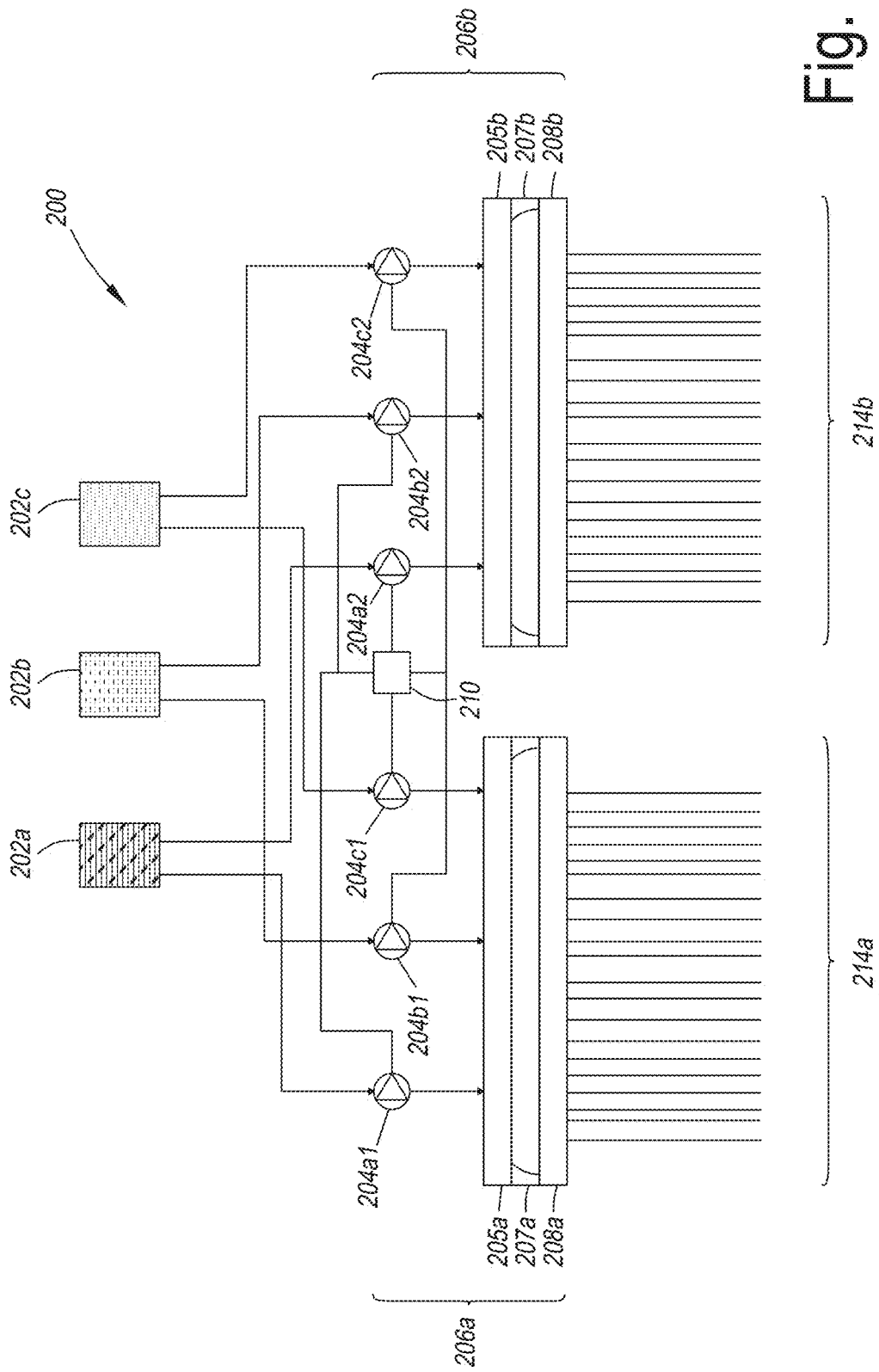

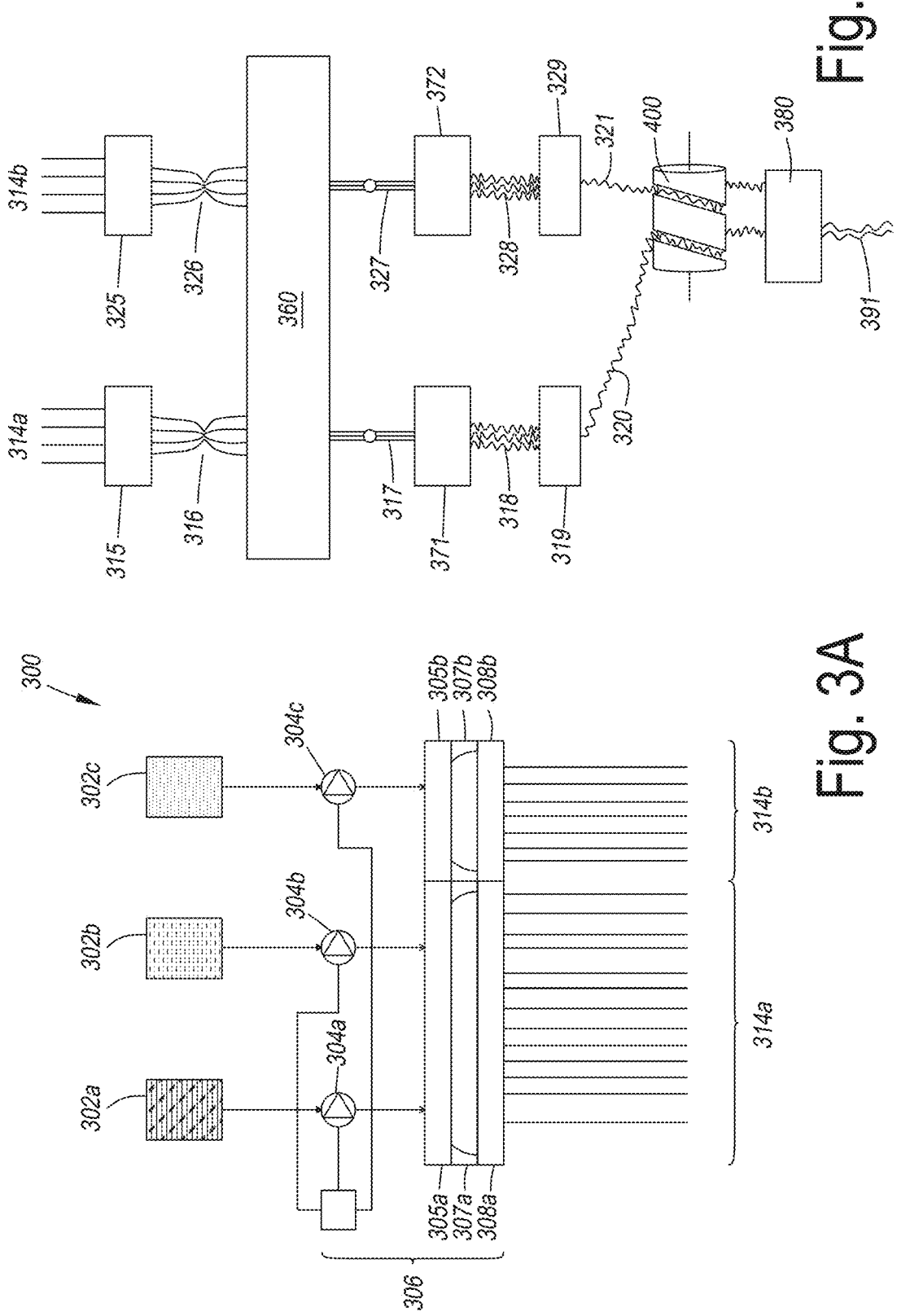

SYSTEMS AND METHODS FOR PRODUCING A BUNDLE OF FILAMENTS AND/OR A YARN

BACKGROUND

Melt spun filaments, such as melt spun filaments of PET are known in the art. Some types of polymers, hence filaments, strands or bundles, are difficult to dye, or to provide with a color varying along the length of the filament, bundle or strand.

It is known to change the color of filaments in a bundle by changing the dye sourcing. However, this process is time consuming and can be wasteful. In addition, it is also known in US Published Patent Application No. 2010/0297442 to vary the output of spin pumps when spinning a plurality of filament bundles that each have a different color to provide a color variation along the length of a composite thread made with the plurality of filament bundles.

However, a need in the art exists for systems and methods for improving the color variation of a bundle of filaments and/or a yarn.

BRIEF SUMMARY

Various implementations include systems and methods of providing multifilament bundles of melt spun polymer filaments that provide a color variation along the length of the filament, bundle, or strand.

A first aspect includes a system for producing at least one bundle of filaments. The system includes N extruders, wherein N is an integer greater than 1, at least one spin station for receiving molten thermoplastic polymer streams from the N extruders, and a processor. Each extruder includes a thermoplastic polymer having a color, hue, and/or dyability characteristic, and the colors and/or hues of the N extruders are different from each other. Each spin station includes at least one spinneret through which a plurality of melt-spun filaments are spun from at least two of the molten thermoplastic polymer streams received by the spin station and a group of N spin pumps upstream of the spinneret. Each spin pump is in fluid communication and is paired with one of the N extruders. The processor is in electrical communication with the N spin pumps and is configured to execute computer readable instructions that cause the processor to adjust the volumetric flow rate of the thermoplastic polymers pumped by each spin pump to achieve a ratio of the thermoplastic polymers to be included in a yarn comprising the filaments spun from the spinneret. In some implementations, the number of extruders N is 3 or 4.

In some implementations, the instructions further cause the processor to determine the volumetric flow rate of each thermoplastic polymer to be pumped by each spin pump and generate the instructions to the spin pumps based on the volumetric flow rate determinations.

In some implementations, the instructions also cause the processor to adjust the timing of the volumetric flow rate changes and hence adjust the corresponding denier and/or color changes in the yarn. The instructions cause the processor to adjust the speeds and volumetric flow rates of some or all of the spin pumps for an amount of time based on a desired color variation in the yarn.

In some implementations, the instructions cause the processor 110 to randomize the amount of time that the speeds and volumetric flow rates through some or all of the spin pumps are varied.

In some implementations, the spin station is a first spin station, and the group of N spin pumps are the first group of N spin pumps. The system further comprises a second spin station and a second group of N spin pumps upstream, wherein each spin pump of this second group of spin pumps is in fluid communication and is paired with one of the N extruders. The ratio is a first ratio for the first spin station, and the instructions further cause the processor to adjust the volumetric flow rate of the thermoplastic polymers pumped from each spin pump of this second group of spin pumps to achieve a second ratio of the thermoplastic polymers to be included in the filaments spun from the spinneret of the second spin station. In some implementations, the first ratio and the second ratio are different.

In some implementations, the system comprises M spin stations and M groups of N spin pumps upstream of the at least one spinneret for each M spin station, wherein each spin pump of each of the M groups of spin pumps is in fluid communication and is paired with one of the N extruders, and wherein the instructions further cause the processor to adjust the volumetric flow rate of the thermoplastic polymers pumped from each spin pump of each of the M groups of spin pumps to achieve M ratios of the thermoplastic polymers to be included in the filaments spun from the at least one spinneret of each M spin station. According to some implementations, at least two ratios of the M ratios are different. In other implementations, all of the M ratios are different.

In some implementations, the at least one spinneret is a single spinneret through which the N polymer streams are spun, and the N polymer streams are combined prior to being spun through the single spinneret.

In some implementations, the N polymer streams are at least partially mixed prior to being spun through the single spinneret.

In some implementations, an average denier per filament of each of the plurality of filaments varies by ±5% along a length of each filament.

In some implementations, the at least one spinneret comprises a first spinneret and a second spinneret, and each spin station comprises at least one manifold disposed between the spinnerets and the N pumps, the manifold directing at least two of the N polymer streams to the first spinneret and at least one of the N polymer streams to the second spinneret.

In some implementations, the manifold is a static manifold.

In some implementations, the manifold is a dynamic manifold.

In some implementations, the dynamic manifold comprises N inlets and at least N+1 outlets, wherein each inlet is in fluid communication with a respective one of N extruders, and at least one inlet is in communication with at least two outlets via channels that extend between the inlet and the outlets and comprises at least one valve that controls flow of the thermoplastic polymer stream between the at least one inlet and the at least two outlets.

In some implementations, the spin station further includes at least one mixing plate disposed between the at least one spinneret and the at least one manifold, the at least one mixing plate defining one or more channels through which one or more molten thermoplastic polymer streams flow through the at least one mixing plate to the at least one spinneret.

In some implementations, the filaments spun from the spinneret include at least a first group of filaments and a second group of filaments, wherein the first group of the filaments have a first color, hue, and/or dyability characteristic, the first color, hue, and/or dyability characteristic being extruded from a first of the N extruders, and the second group of the filaments have a second color, hue, and/or dyability characteristic, the second color, hue, and/or dyability characteristic being extruded from a second of the N extruders. In some implementations, the filaments spun from the spinneret further include a third group of filaments, wherein the third group of the filaments have a third color, hue, and/or dyability characteristic, wherein the third color, hue, and/or dyability characteristic is a mixture of the first color, hue, and/or dyability characteristic and the second color, hue, and/or dyability characteristic.

In some implementations, the system further comprises at least one drawing device to elongate said N bundles of spun filaments; an initial tacking device upstream to or integrated within the at least one drawing device to tack at least one of said N bundles of spun filaments prior to or during the elongation of the N bundles of spun filaments; at least one texturizer to texturize said N bundles of elongated spun filaments; and a final tacking device to tack said N bundles of texturized spun filaments to provide a BCF yarn.

In some implementations, the at least one texturizer comprises at least a first texturizer and a second texturizer, and at least one of said N bundles of spun filaments is texturized individually from the other N bundles of spun filaments through the first texturizer.

In some implementations, the at least one texturizer comprises N texturizers, and each of said N bundles of spun filaments are texturized individually from each other through respective N texturizers.

In some implementations, the system further comprises an intermediate tacking device and a mixing cam disposed between the at least one texturizer and the final tacking device, the intermediate tacking device for tacking at least one of said N bundles of texturized spun filaments and the mixing cam for positioning tacked and texturized bundles relative one to the other before reaching the final tacking device.

In some implementations, the system further comprises at least one drawing device to elongate said N bundles of spun filaments; at least a first texturizer and a second texturizer, wherein at least one of said N bundles of elongated spun filaments is texturized individually through the first texturizer separately from the other said N bundles of elongated spun filaments; and a final tacking device to tack said N bundles of texturized spun filaments to provide a BCF yarn.

In some implementations, the system further comprises an intermediate tacking device disposed between the at least one texturizer and the final tacking device, the intermediate tacking device for tacking at least one of said N bundles of texturized spun filaments.

In some implementations, the system further comprises a mixing cam disposed between the at least one texturizer and the final tacking device, the mixing cam for positioning tacked and texturized bundles relative to one to the other before reaching the final tacking device.

In some implementations, the system further comprises at least one drawing device to elongate said N bundles of spun filaments; at least one texturizer to texturize said N bundles of elongated spun filaments; a second tacking device disposed between the texturizers and the final tacking device, the second tacking device for tacking at least one of said N bundles of texturized spun filaments; and a final tacking device to tack said N bundles of texturized spun filaments to provide a BCF yarn.

In some implementations, the system further comprises a mixing cam disposed between the texturizers and the final tacking device, the mixing cam for positioning tacked and texturized bundles relative to one to the other before reaching the final tacking device.

In a second aspect, a bundle of filaments produced using the system above is provided.

In some implementations, a yarn comprising the bundle of filaments according to the second aspect is provided. In some implementations, the yarn is a bulked continuous filament (BCF) yarn. And, in some implementations, a carpet comprises pile made with the yarn.

In a third aspect, a method to produce at least one bundle of filaments is provided. The method includes (1) providing N streams of molten thermoplastic polymer, wherein N is an integer greater than 1, and each stream has a different color, hue, and/or dyability characteristic; (2) providing at least one spin station having N feeds for receiving the N streams of polymer, the spin station comprising at least one spinneret and a group of N spin pumps, each pump pumping one of the N streams of polymer to one of the N feeds, the N spin pumps being disposed upstream of the at least one spinneret and at least two of the N feeds being in fluid communication with one of the at least one spinnerets; and (3) adjusting a volumetric flow rate of each thermoplastic polymer stream pumped to the respective feed of the spin station to achieve a ratio of the thermoplastic polymer streams to be included in a yarn comprising the filaments spun from the at least one spinneret.

In some implementations, the at least one spin station comprises a first spin station and a second spin station, and the ratio is a first ratio, wherein the volumetric flow rate of each polymer stream pumped to the respective feed of the first spin station is based on the first ratio of the streams to be included in the filaments spun by the spinneret of the first spin station, and the volumetric flow rate of each polymer stream pumped to the respective feed of the second spin station is based on a second ratio of the streams to be included in the filaments spun by the spinneret of the second spin station. For example, in some implementations, the first ratio and the second ratio are different.

In some implementations, each of N streams of molten thermoplastic polymer are provided by one of N extruders such that each stream remains separated from other streams until reaching the spin station.

In a fourth aspect, a bundle of filaments produced using the method above is provided.

In some implementations, a yarn comprising the bundle of filaments according to the fourth aspect is provided. In some implementations, the yarn is a bulked continuous filament (BCF) yarn. And, in some implementations, a carpet comprises pile made with the yarn.

In a fifth aspect, a system for producing M yarns is provided, wherein M is an integer greater than 1. The system includes N extruders, M spin stations, and a processor. N is an integer greater than 1, and each extruder includes a thermoplastic polymer having a color, hue, and/or dyability characteristic. The colors and/or hues of the N extruders are different from each other. Each spin station is for producing at least one bundle of filaments and for receiving molten thermoplastic polymer streams from the extruders. Each spin station comprises at last one spinneret through which a plurality of melt-spun filaments are spun from at least two of the molten thermoplastic polymer streams received by the respective spin station and a group of N spin pumps upstream of the spinneret for the respective spin station, wherein each spin pump is in fluid communication and is paired with one of the N extruders. The processor is in electrical communication with the N*M spin pumps and is configured to execute computer readable instructions that cause the processor to adjust the volumetric flow rate of the thermoplastic polymers pumped from each spin pump to achieve a ratio of the thermoplastic polymers to be included in each of the M yarns comprising the filaments spun from the at least one spinneret of the respective M spin station.

In some implementations, for each of the M spin stations, the filaments spun from the respective at least one spinneret include at least a first group of filaments and a second group of filaments. The first group of the filaments have a first color, hue, and/or dyability characteristic, the first color, hue, and/or dyability characteristic being extruded from a first of the N extruders, and the second group of the filaments have a second color, hue, and/or dyability characteristic, the second color, hue, and/or dyability characteristic being extruded from a second of the N extruders.

In some implementations, the filaments spun from the respective at least one spinneret of each of the M spin stations further include a third group of filaments, the third group of the filaments have a third color, hue, and/or dyability characteristic, wherein the third color, hue, and/or dyability characteristic is a mixture of the first color, hue, and/or dyability characteristic and the second color, hue, and/or dyability characteristic.

In some implementations, the ratio to be included in each of the M yarns are different.

In a sixth aspect, a yarn comprising a plurality of filaments is provided, wherein each filament has a color and/or hue that extends from an external surface to a center thereof and for at least a subset of the plurality of filaments, the color and/or hue of each filament within the subset varies along a length of the filament. In some embodiments, the filaments are solid-dyed (also referred to herein as solution-dyed). In some embodiments, the plurality of filaments has at least a first set of filaments and a second set of filaments, wherein the first set of filaments has a first color and/or hue at a radial cross section of the plurality of filaments and the second set of filaments has a second color and/or hue at the radial cross section, and the first color and/or hue is different than the second color. In some embodiments, the sixth aspect is a bulked continuous filament (BCF) yarn.

In a seventh aspect a yarn comprising a plurality of filaments is provided, wherein said plurality of filaments has at least a first set of filaments and a second set of filaments, wherein the first set of filaments has a first color, hue, and/or dyability characteristic at a radial cross section of the plurality of filaments and the second set of filaments has a second color, hue, and/or dyability characteristic at the radial cross section, and the first color, hue, and/or dyability characteristic is different than the second color, hue, and/or dyability characteristic. In some embodiments, the seventh aspect is a bulked continuous (BCF) yarn.

Clearly, the yarns of the sixth and/or seventh aspect may or may not be obtained using the methods, bundle of filaments, and/or systems of the aspects listed above. The yarns of the sixth and/or seventh aspect may further show preferred characteristics equal or similar to those of the yarns produced by such methods and/or systems, without necessarily having been obtained in that manner.

In an eight aspect, a carpet, rug, or carpet tile (collectively referred to herein as "carpet") is provided comprising pile made with the yarn of the sixth and/or seventh aspect and/or obtained using the methods, bundle of filaments, and/or systems of any of the first through fifth aspects.

BRIEF DESCRIPTION OF THE DRAWINGS

Example features and implementations are disclosed in the accompanying drawings. However, the present disclosure is not limited to the precise arrangements shown, and the drawings are not necessarily drawn to scale.

FIG. 1 illustrates a schematic diagram of a system according to one implementation.

FIG. 2 illustrates a schematic diagram of a system according to another implementation.

FIG. 3A illustrates a schematic diagram of a spinning system according to another implementation.

FIG. 3B illustrates a schematic diagram of optional post-spinning processes for the spinning system in FIG. 3A.

DETAILED DESCRIPTION

Figure 4A:
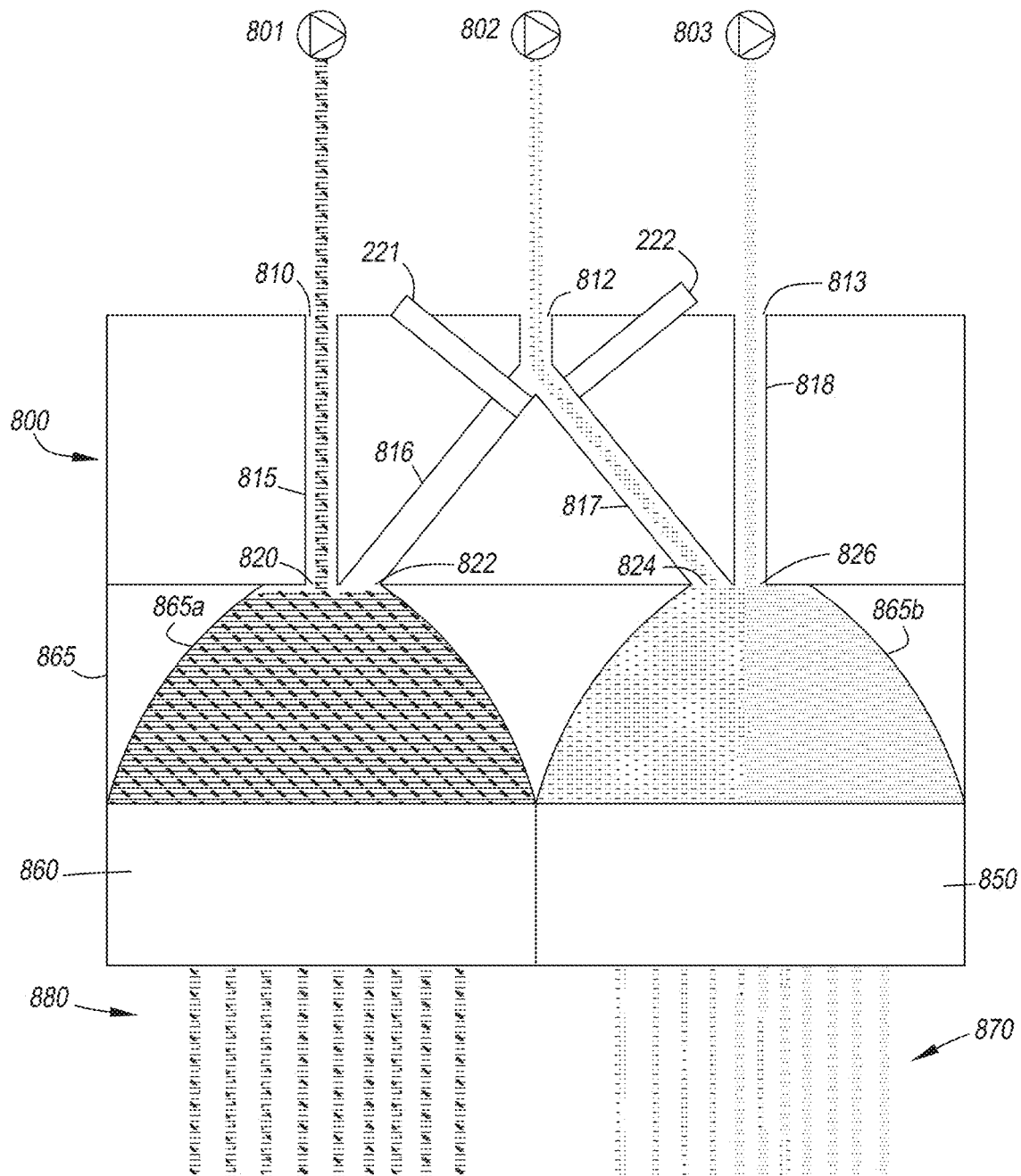
FIGS. 4A-4D illustrate a cross-sectional view of a dynamic manifold according to one implementation.

Various implementations include systems and methods for producing a bundle of filaments, yarn made therefrom, and carpets made from the yarn. The system allows for the color effect of or mix of colors within a bundle of filaments to be changed by altering the volumetric flow rate of spin pumps that are in fluid communication and paired with a plurality of extruders that each include a thermoplastic polymer having a different color, hue, and/or dyability characteristic than the other extruders.

For example, in various implementations, the system includes N extruders, wherein N is an integer greater than 1, at least one spin station for receiving molten thermoplastic polymer streams from the N extruders, and a processor. Each extruder includes a thermoplastic polymer having a color, hue, and/or dyability characteristic, and colors, hues, and/or dyability characteristics of the N extruders are different from each other. Each spin station includes at least one spinneret through which a plurality of melt-spun filaments are spun from at least two of the molten thermoplastic polymer streams received by the spin station and a group of N spin pumps upstream of the spinneret. Each spin pump is in fluid communication and is paired with one of the N extruders. The processor is in electrical communication with the N spin pumps and is configured to execute computer readable instructions that cause the processor to adjust the volumetric flow rate of the thermoplastic polymers pumped by each spin pump to achieve a ratio of the thermoplastic polymers to be included in the filaments spun from the at least one spinneret.

In addition, in some implementations, each spin station also includes at least one manifold (static or dynamic) and at least one mixing plate wherein each mixing plate defines at least one channel. The at least one mixing plate is disposed between the at least one manifold and the at least one spinneret.

For example, FIG. 1 illustrates a schematic diagram of a system according to one implementation. The system 100 includes a first extruder 102a, a second extruder 102b, a third extruder 102c, and a spin station 106 having a manifold 105, a mixing plate 107, a spinneret 108, a first spin pump 104a, a second spin pump 104b, and a third spin pump 104c. The system 100 also includes a processor 110 in electrical communication with the spin pumps 104a, 104b, 104c. The first spin pump 104a is in fluid communication and is paired with the first extruder 102a, the second spin pump 104b is in fluid communication and is paired with the second extruder 102b, and the third spin pump 104c is in fluid communication and is paired with the third extruder 102c.

Each extruder 102a, 102b, 102c includes a thermoplastic polymer having a color, hue, and/or dyability characteristic. The colors, hues, and/or dyability characteristics in each extruder 102a, 102b, 102c are different from each other. The manifold 105 of the spin station 106 receives molten thermoplastic polymer streams from the extruders 102a, 102b, 102c. Spin pumps 104a, 104b, 104c pump the molten thermoplastic polymer through the manifold 105, which feeds the molten thermoplastic polymer to the mixing plate 107 and then through the spinneret 108, and the spinneret 108 spins the molten thermoplastic polymer streams into melt-spun filaments 114.

Examples of thermoplastic polymers that may be used for the filaments named in any of the first through seventh aspects include polyamides, polyesters, and polyolefins. For example, the polymer may be aromatic or aliphatic polyamide, such as PA6, PA66, PA6T, PA10, PA12, PA56, PA610, PA612, PA510. The polyamide can be a polyamide blend (copolymer) or homopolymer or partially recycled or fully based upon recycled polyamide.

In other implementations of any of the first through seventh aspects, the polymer may be polyester, such as polyethylene terephthalate (PET), polybutyl terephthalate (PBT), or polytrimethylene terephthalate (PTT). The PET can be virgin PET or partially or fully based upon recycled PET, such as the PET described in U.S. Pat. No. 8,597,553.

In yet other implementations of any of the first through seventh aspects, the polymer may be a polyolefin, such as polyethylene (PE) or polypropylene (PP). In certain implementations, the polymer is PET, PTT, PP, PA6, PA66 or PES.

In some implementations of any of the first through seventh aspects, the bundles are made from the same polymer. However, in other implementations, bundles may be made from different polymers.

According to some implementations, the polymer of the filaments may be solution dyed polymer. In some implementations, the solution dyed polymer filaments are space dyed after processing (also referred to as "over dying"). And, in other implementations, the filaments are not solution dyed and are space dyed or dyed regularly after processing. A solution dyed polymer has a coloring agent added to the polymer prior to filament formation out of the spinneret. A space dyed polymer has a coloring agent that is added to the filament after formation out of the spinneret.

Dyability characteristic refers to a filament's affinity to absorb a dye under the same processing conditions. For example, non-solution-dyed filaments may appear white after spinning due to the lack of presence of dye molecules, pigments, or other molecules that would provide a different color than the material substrate. When subjected to a dyeing process, for example PET using disperse dyes, a molten stream formed with a deep dye PET would have a darker color saturation than a molten stream produced with a traditional PET.

The processor 110 is configured to execute computer readable instructions that cause the processor 110 to adjust the volumetric flow rate of the thermoplastic polymer pumped by each spin pump 104a-c to achieve a ratio of the thermoplastic polymers to be included in the filaments 114 spun from the spinneret 108. Adjusting the volumetric flow rate of the thermoplastic polymer extruded from each of the extruders 102a, 102b, 102c adjusts the ratio of the thermoplastic polymers in the filaments 114, which changes the overall color, hue, and/or dyability characteristic of the bundle of filaments 114 spun through the spinneret 108. The ratio of the thermoplastic polymers to be included in the filaments 114 refers to the ratio of colors, hues, and/or dyability characteristics from each extruder that are included in the bundle of the filaments 114. The colors, hues, and/or dyability characteristics of the spun filaments 114 may include filaments having the color, hue, and/or dyability characteristic of the polymer in the first extruder 102a, filaments having the color, hue, and/or dyability characteristic of the polymer in the second extruder 102b, filaments having the color, hue, and/or dyability characteristic of the polymer in the third extruder 102c, and/or filaments having a color, hue, and/or dyability characteristic that is a mixture of the colors, hues, and/or dyability characteristics from the extruders 102a, 102b, 102c. For example, the filaments 114 may include a first group of filaments that have the color, hue, and/or dyability characteristic of the thermoplastic polymer from the first extruder 102a, a second group of filaments that have the color, hue, and/or dyability characteristic of the thermoplastic polymer from the second extruder 102b, a third group of filaments that have the color, hue, and/or dyability characteristic of the thermoplastic polymer from the third extruder 102c, and/or a fourth group of filaments that have a color, hue, and/or dyability characteristic that is a mixture of the colors, hues, and/or dyability characteristics from the extruders 102a, 102b, and/or 102c. For example, at least a portion of the filaments in the fourth group may have a color and/or hue that is a mixture of two or more colors and/or hues of the streams. In addition or in the alternative, at least a portion of the filaments in the fourth group may have different colors and/or hues along different portions of a length of the filament and/or within a radial cross section of at least one filament within each of the portions along the length of the filament. For example, a first portion of a length of a filament may have a first color and a second portion of the length of the filament may have a second color. As another example, a portion of the length of the filament may have a color that is a mixture of two or more colors. And, as another example, a radial cross section of a filament through one portion of the length of the filament may have two or more different colors and/or hues than the radial cross section of the filament at another portion of the length of the filament. When brought together into one yarn, the groups of filaments provide a blended color appearance.

This system 100 allows for filaments to be made having more colors and/or hues than the number of extruders providing each color or hue. For example, if the extruders 102a-102c each have thermoplastic polymers solution dyed red, blue, and yellow, various ratios of these thermoplastic polymers yield filaments having these colors and combinations thereof, such as purple, orange, and green.

For example, in some implementations, the speed of each spin pump 104a-104c is at least 2 RPM. And, in certain implementations, a maximum speed of each spin pump 104a-104c is 30 RPM. However, in other implementations, the maximum speed of each spin pump may be higher. If other process controls are the same, increasing the RPM of the spin pump 104a-104c increases the linear density, or titer (e.g., also referred to as "denier per filament", "denier per fiber" or "DPF")) per filament.

In addition, the average denier of each bundle of filaments can be increased or decreased by changing the speed of the pumps. In some implementations, once selected, the average denier of the bundle of filaments spun through the spinneret 108 of the spin station 106 is constant or does not vary more than ±5%, according to some implementations. By increasing the average denier of a bundle, the color from that bundle is visibly more prevalent in the yarn. For example, the speed of the pump providing at least one of the molten thermoplastic polymer streams to the spin station may be increased while the speed of the pumps providing the other molten thermoplastic polymer streams to the spin station may be kept the same or decreased, resulting in the yarn having more of the color of the stream being pumped at a higher speed than the other streams. Increasing and decreasing the speed of at least one or more pumps can also be varied according to a certain frequency and amplitude, in some implementations, creating portions of a length of the bundle that have a different color(s), hue(s), and/or dyability characteristic(s) than other portions of the length.

In some implementations, the instructions also cause the processor 110 to adjust the timing of the volumetric flow rate changes and hence adjust the corresponding denier and/or color changes in the yarn. For example, the following description is for a sequence of steps performed by the processor 110. At step 1, the instructions cause the spin pump 104a to be at a higher speed (for example, 50% of maximum speed) and the spin pump 104b and 104c to be at a lower speed (for example, each at 25% of maximum speed) for an initial x1 seconds (for example, x1 is 1 sec, 2 secs, 3 secs, 4, secs, 5 secs, 6 secs, 7 secs, 8 secs, and so on). The amount of time that a specific combination of spin pump speeds is held determines the length of the particular color pattern produced by the combination of the spin pump speeds in the yarn. After the initial x1 seconds, at step 2, the instructions cause the processor 110 to change the speeds of the pumps such that the spin pumps 104a and 104b are at a lower speed (for example 25% of maximum speed) and the spin pump 104c is at a higher speed (for example 50% of maximum speed) for x2 seconds. In some embodiments, x1=x2, and in other embodiments, x1 is different from x2. At step 3, after the x2 seconds elapses, the instructions cause the processor 110 to change the speeds of the pumps such that the spin pumps 104a and 104c are at a lower speed (for example at 25% of maximum speed) and spin pump 104b is at a higher speed (for example at 50% of maximum speed) for x3 seconds. Again, x3 can be equal to x1 and/or x2. In other embodiments, x3 can be different from x1 and/or x2. After x3 seconds, at step 4, the instructions cause the processor 110 to change the speeds of the pumps such that the spin pumps 104a, 104b, 104c are at the same speed (for example, each at 33.33% of the maximum speed). The above sequence or a variation thereof is repeated to produce the desired color variation in the yarn.

In another example implementation, the instructions cause the processor 110 to randomize the above steps to produce random color variation in the yarn. For example, an internal clock associated with the processor 110 selects an overall timer with a first random number greater than 0 and to and including y secs (for example, y can be 5 secs, 6 secs, 7 secs, 7.5 secs, 8 secs, 9 secs, 10 secs, and so on). Then the instructions cause the processor 110 to select a second set of random numbers for each of x1, x2, x3, and x4 in step 1-4 above (for example, x1=2 secs, x2=3 secs, x3=1 sec, x4=2 sec). As the instructions cause the processor to execute steps 1-4, the overall timer based on the first random number (for example, y=7.5 secs) decides when the process is reset. In the above example, when the time associated with the overall timer elapses, the instructions cause the processor 110 to terminate step 4 at x4=1.5 secs and restart the process steps from step 1 to step 4. In other embodiments, the steps 1-4 described above can be executed by the processor 110 in any order. The processor can also randomize the sequence of steps 1-4. In other embodiments, the speed of the pumps 104a, 104b, 104c for each of the above steps is randomized. For example, at step 1, the instructions cause the processor 110 to change the speed of the pumps such that pumps 104a and 104b are at a random lower speed (for example, at 20% of maximum speed and 28% maximum speed respectively) and spin pump 104c is at a higher speed (for example, at 52% of maximum speed).

In some implementations, the instructions also cause the processor 110 to determine the volumetric flow rate of each thermoplastic polymer to be pumped by each spin pump 104a, 104b, 104c to achieve the desired ratio and generate the instructions to the spin pumps 104a, 104b, 104c based on the volumetric flow rate determinations. However, in other implementations, the volumetric flow rate for each spin pump 104a, 104b, 104c may be determined by another processor or otherwise input into the system 100. In addition, in other implementations, the instructions to the spin pumps 104a, 104b, 104c may be generated by another processor or otherwise input into the system 100.

Figure 10:
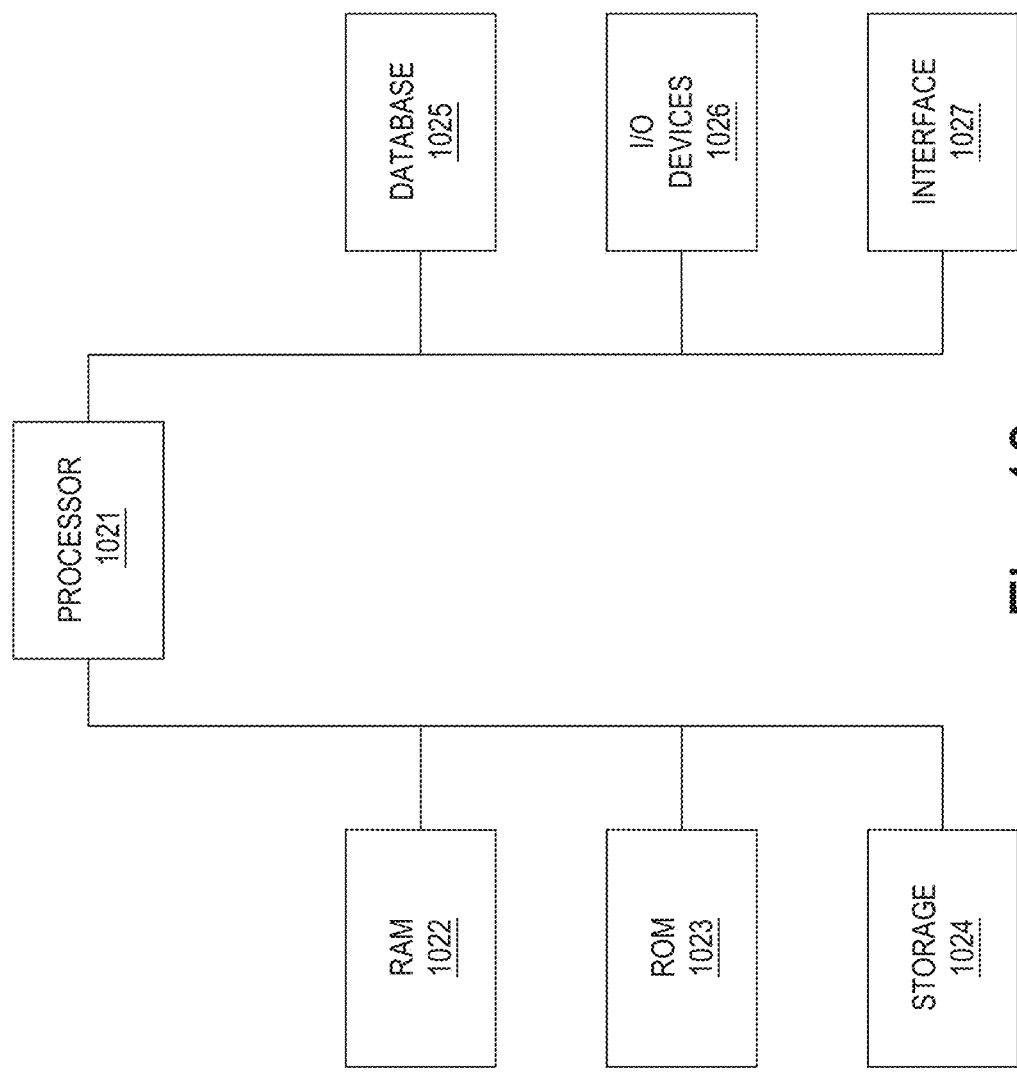
FIG. 10 illustrates an example computing device that can be used according to embodiments described herein.

In some implementations, the computer readable instructions are stored on a computer memory that is in electrical communication with the processor 110 and disposed near the processor (e.g., on the same circuit board and/or in the same housing). And, in other implementations, the computer readable instructions are stored on a computer memory that is in electrical communication with the processor but is remotely located from the processor. In some instances, the processor 110 and memory form a computer device such as that shown in FIG. 10, which is described below. FIG. 10 illustrates an example computing system that includes a processor, which can include processor 110. The system in FIG. 10 may be used by system 100, for example.

The radial cross-sectional shape of each filament in any of the first through seventh aspects may be the same as the other filaments or different, e.g. depending on the shapes of the openings defined by the spinneret through which each filament is spun. For example, the filaments may have radial cross sections that are circular, oval, trilobal, fox, or other suitable shape. In addition, the filaments may be solid or define at least one hollow void. Similarly, the size of the spinneret openings may be the same or different, depending on the desired denier per filament for each filament.

In some implementations, the volumetric flow rate being extruded by one of the pumps may be reduced by 90% relative to a baseline volumetric flow rate, which is the total volumetric flow rate being extruded divided by the number of pumps for each spin station. And, in some implementations, the volumetric flow rate may be reduced to zero, assuming that the thermoplastic polymer would not overheat in the spinning station.

The manifold 105 in FIG. 1 is a static manifold, such as a honeycomb or static mixer. However, in other implementations, the manifold may be a dynamic manifold having multiple inlets in fluid communication with valves for controlling the flow through each inlet and the outlets. The valves are selectively opened or closed to regulate the flow of the thermoplastic polymer streams through the manifold. For example, in some implementations, the dynamic manifold comprises N inlets and at least N+1 outlets, wherein each inlet is in fluid communication with a respective one of N extruders, and at least one inlet is in communication with at least two outlets via channels that extend between the inlet and the outlets and comprises at least one valve that controls flow of the thermoplastic polymer stream between the at least one inlet and the at least two outlets. FIGS. 4A-4D illustrates an example dynamic manifold 800 that may be used in the spin stations described herein and shown in FIGS. 1-3. As shown, the dynamic manifold has inlets 810, 812, 813, and each inlet 810, 812, 813 is in fluid communication with each pump 801, 802, 803, which is in fluid communication with each extruder (not shown). Inlet 810 is in fluid communication with outlet 820 through channel 815, inlet 812 is in fluid communication with outlet 822 through channel 816 and with outlet 824 through channel 817, and inlet 813 is in fluid communication with outlet 826 through channel 818. A mixing plate 865 is disposed between the dynamic manifold 800 and the spinnerets 850, 860. The mixing plate 865 defines two channels 865*a*, 865*b*. An inlet to channel 865*a* is adjacent outlets 820, 822, and an inlet to channel 865*b* is adjacent outlets 824, 826. An outlet to channel 865*a* is adjacent to and feeds spinneret 860, and an outlet to channel 865*b* is adjacent to and feeds spinneret 850.

Valves 221, 222 are disposed within channels 816 and 817, respectively. Valves 221, 222 are selectively opened and closed to regulate the flow of the thermoplastic polymer stream from pump 802 to the outlets 822, 824. As shown in FIG. 4A, valve 221 is completely closed and valve 222 is completely open, which causes the polymer stream from pump 802 to be fully directed to outlet 824. Because outlet 824 is adjacent outlet 826 and these outlets 824, 826 ultimately feed spinneret 850, the bundle of filaments 870 spun from spinneret 850 include the polymer streams from pumps 802 and 803. And, because outlet 822 is not receiving any polymer from pump 802, the bundle of filaments 880 spun from spinneret 860 only includes the polymer stream from pump 801.

Figure 4B:
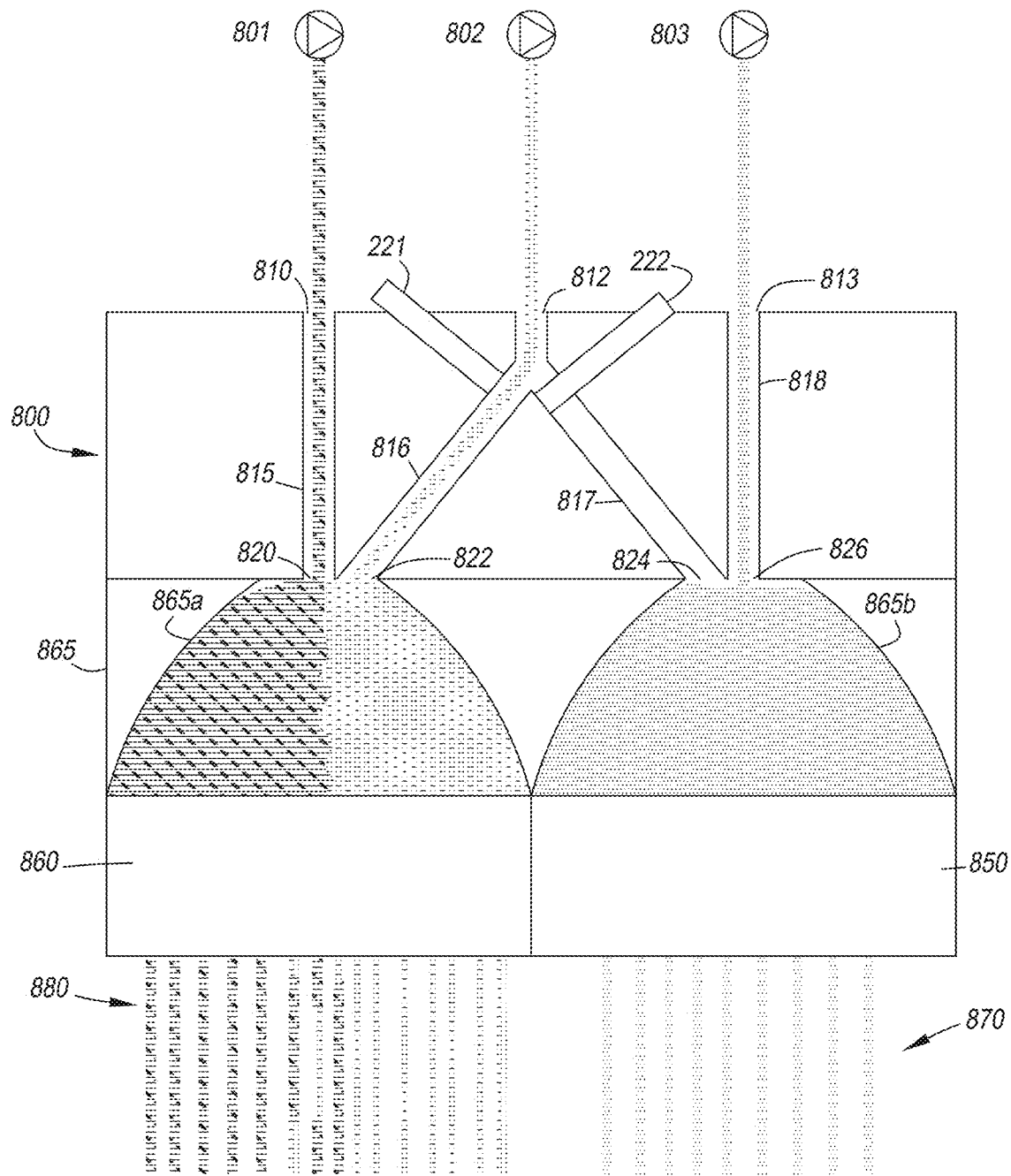

As shown in FIG. 4B, valve 222 is completely closed and valve 221 is completely open, which causes the polymer stream from pump 802 to be fully directed to outlet 822. Because outlet 822 is adjacent outlet 820 and these outlets 822, 820 feed spinneret 860, the bundle of filaments 880 spun from spinneret 860 include the polymer streams from pumps 801 and 802. And, because outlet 824 is not receiving any polymer from pump 802, the bundle of filaments 870 spun from spinneret 850 only includes the polymer stream from pump 803.

Figure 4C:
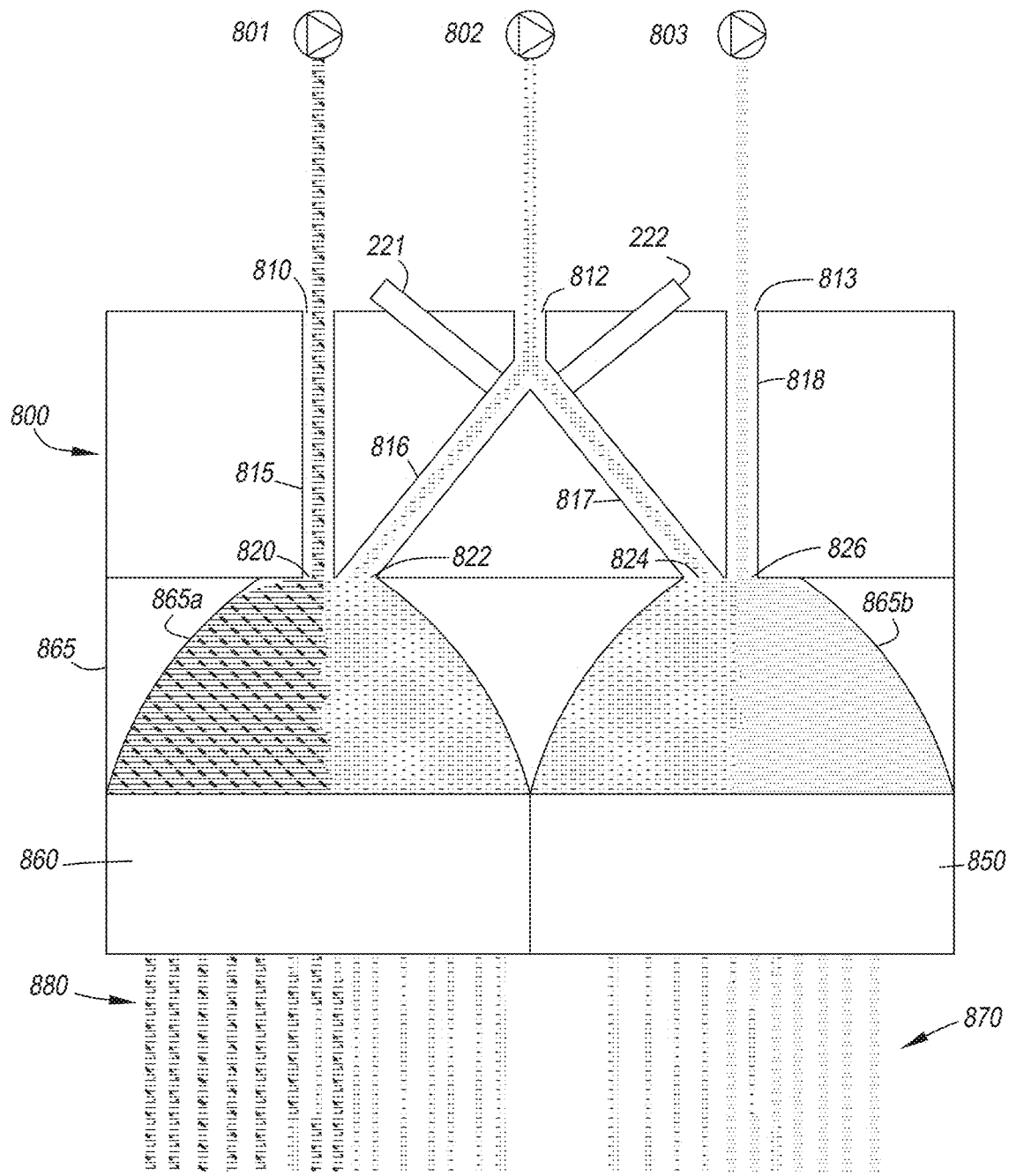

As shown in FIG. 4C, valves 221, 222 are completely open, which causes the polymer stream from pump 802 to be divided between outlets 822 and 824. Thus, the bundle of filaments 880 spun from spinneret 860 includes the polymer streams from pumps 801 and 802, and the bundle of filaments 870 spun from spinneret 850 includes the polymer streams from pumps 802 and 803. However, the amount of polymer stream from pump 802 that is spun through spinneret 860 is half of the amount that was spun through the spinneret 860 in FIG. 4B, and the amount of polymer stream from pump 802 that is spun through spinneret 850 is half of the amount that was spun through the spinneret 850 in FIG. 4A.

Figure 4D:
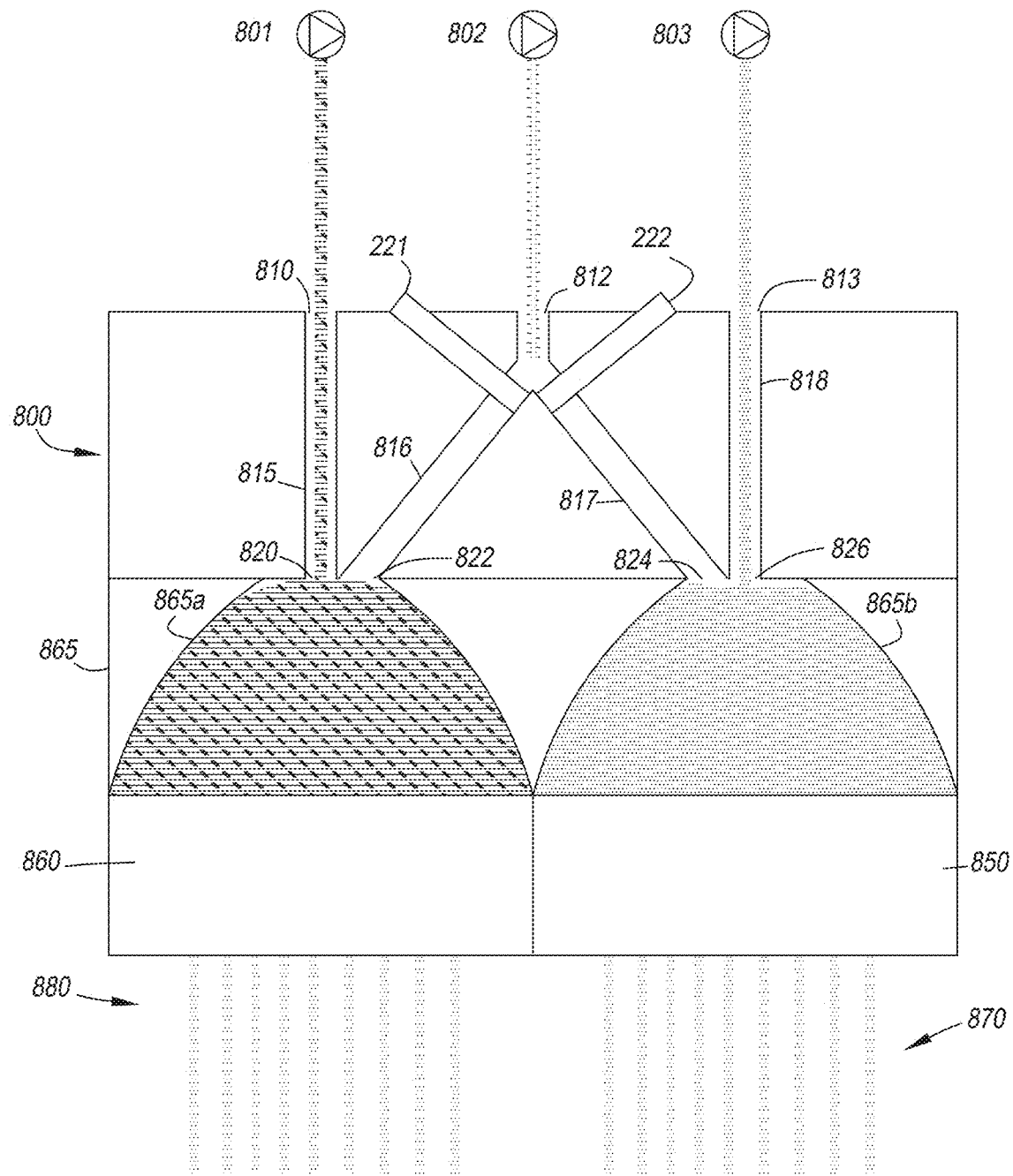
Figure 5:
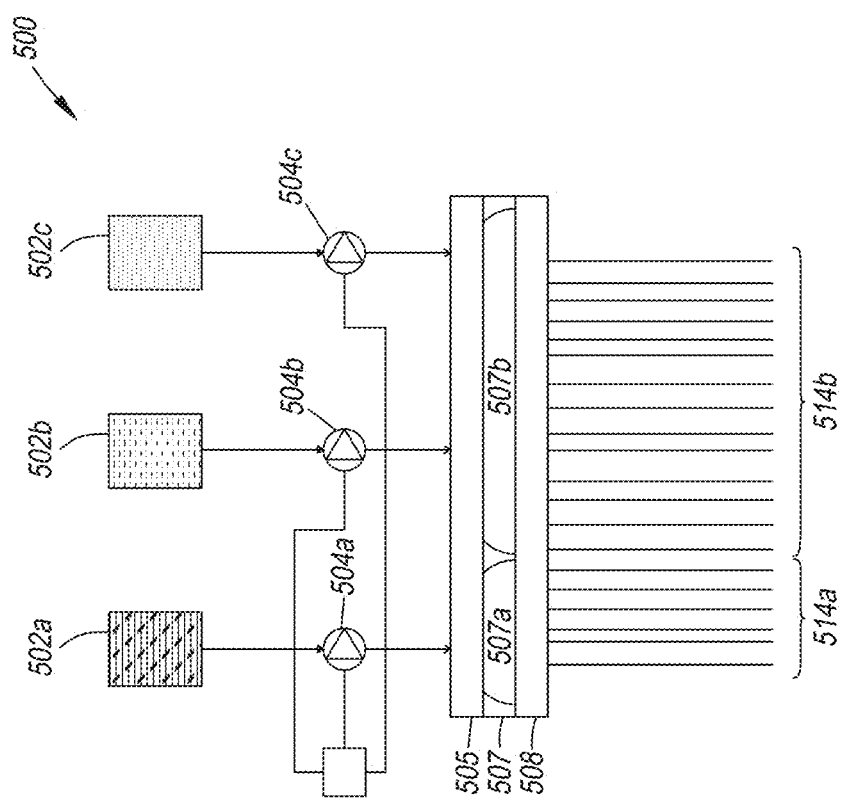
FIG. 5 illustrates a schematic diagram of a spinning system according to another implementation.

As shown in FIG. 4D, the valves 221, 222 are completely closed, which causes the polymer stream from pump 802 to not reach outlets 822, 824. In such an instance, the yarn would not include the color and/or hue of the polymer stream from pump 802 while the valve 221, 222 are closed.

Although FIGS. 4A-4D show the valves 221, 222 completely open or closed, the valves 221, 222 can be partially open/closed to control the amount of polymer stream being fed to the spinnerets 850, 860.

In other implementations, other inlets in the dynamic manifold may have more than one channel between the inlet and multiple outlets and valves within the channels to control the volumetric flow rate of thermoplastic polymer flowing to each spinneret. And, in other implementations, inlets that are in communication with more than one channel may include one valve within the inlet that controls the flow of the thermoplastic polymer stream to the channels that are in fluid communication with the respective inlet.

In addition, the system 100 may be run at a speed of at least 2600 meters per minute, which is faster than prior art systems, since the denier per filament is not changed during a color change. The speed may be increased or decreased based on the desired appearance. And depending on the operating parameters of the system, a change in speed may not affect the appearance of the yarn.

Filaments produced using the system 100 have better wear properties because the color and/or dye extends through the full mass of the filament. Having the dye extend through the entire filament also improves the appearance of cut pile in carpets. In addition, the system 100 is faster and less expensive than prior art systems because the average denier per filament and/or the average denier per bundle can be kept substantially constant and the pumps 104*a*-104*c* do not have to stop to allow for changes in the color of the yarn produced. This system 100 also produces less waste by avoiding the need to stop and start at each color change.

Various implementations also include a yarn that includes a plurality of filaments. Each filament has a color and/or hue from an external surface to a center thereof, and for at least a subset of the plurality of filaments, the color and/or hue of each filament within the subset varies along a length of the filament. For example, in some implementations, the plurality of filaments has at least a first set of filaments and a second set of filaments, wherein the first set of filaments has a first color and/or hue at a radial cross section of the plurality of filaments and the second set of filaments has a second color and/or hue at the radial cross section, and the first color and/or hue is different than the second color. In some implementations, the yarn is bulked continuous filament (BCF) yarn. The yarn is made according to any of the processes described above and/or by any of the systems described above. In addition, some implementations include a carpet that includes pile made with this yarn.

Various implementations also include a yarn that includes a plurality of filaments that have at least a first set of filaments and a second set of filaments. The first set of filaments has a first color, hue, and/or dyability characteristic at a radial cross section of the plurality of filaments, and the second set of filaments has a second color, hue, and/or dyability characteristic at the radial cross section, and the first color, hue, and/or dyability characteristic is different than the second color, hue, and/or dyability characteristic. In some implementations, the yarn is bulked continuous filament (BCF) yarn. The yarn may be made according to any of the processes described above and/or by any of the systems described above. In addition, some implementations include a carpet that includes pile made with this yarn.

In addition, in some implementations, carpet having changing colors, such as the carpet described above, can be made from one continuous BCF yarn, instead of having to stop the process to switch out yarn having a different color.

The yarn may be a bulked continuous filament (BCF) yarn that may be (1) extruded and drawn in a continuous operation, (2) extruded, drawn, and textured in a continuous operation, (3) extruded and taken up in one step and is then later unwound, drawn, and textured in another step, or (4) extruded, drawn, and textured in one or more operations.

Furthermore, in some implementations, the BCF yarn could be used as yarn in carpet or in apparel, for example.

Although the system shown in FIG. 1 has three extruders and three pumps and one spinning station for producing one bundle of filaments, this system can be scaled in other implementations to produce M yarns, wherein M is an integer greater than one. The system allows for the colors and/or hues of the filaments in each yarn to be altered by changing volumetric flow rates of spin pumps in fluid communication and paired with each extruder, without changing the dye sourcing or having to add additional extruders to the system. The system includes N extruders, wherein N is an integer greater than one, M spin stations, and a processor. The N extruders each comprise a thermoplastic polymer having a color, hue, and/or dyability characteristic different from each other. The M spin stations each produce one yarn and receive molten thermoplastic polymer streams from the N extruders. Each of the M spin stations includes at least one spinneret through which a plurality of melt-spun filaments are spun from at least two of the molten thermoplastic polymer streams received by the respective spin station and N spin pumps upstream of the spinneret for the respective spin station, wherein each spin pump is in fluid communication and is paired with one of the N extruders. The processor is in electrical communication with the N*M spin pumps and is configured to execute computer readable instructions that cause the processor to adjust the volumetric flow rate of the thermoplastic polymers pumped from each spin pump to achieve a ratio of the thermoplastic polymers to be included in each of the M yarns spun from each of the M spin stations.

According to some implementations, at least two ratios of the M ratios are different. In other implementations, all of the M ratios are different.

For example, the system 200 in FIG. 2 includes three extruders 202a-202c and two spin stations 206a, 206b. Each spin station 206a, 206b has a spinneret 208a, 208b, respectively, and a group of spin pumps 204a1-204c1 and 204a2-204c2, respectively. Spin pumps 204a1 and 204a2 are paired with extruder 202a. Spin pumps 204b1 and 204b2 are paired with extruder 202b. And, spin pumps 204c1 and 204c2 are paired with extruder 202c. In particular, the first spin station 206a includes a first group of spin pumps 204a1-204c1, and the second spin station 206b includes a second group of spin pumps 204a2-204c2. Each spin pump 204a1-204c1 in the first group of spin pumps is in fluid communication with and is paired with one of the extruders 202a-202c and is in fluid communication with the first manifold 205a, the first mixing plate 207a, and the first spinneret 208a. And, each spin pump 204a2-204c2 in the second group of spin pumps is in fluid communication with and is paired with one of the extruders 202a-202c and is in fluid communication with the second manifold 205b, the second mixing plate 207b, and the second spinneret 208b. Accordingly, thermoplastic polymer pumped from the extruders 202a-202c by the first group of spin pumps 204a1-204c1 is spun through the first spinneret 208a, and thermoplastic polymer pumped from the extruders 202a-202c by the second group of spin pumps 204a2-204c2 is spun through the second spinneret 208b. The denier per filament of the filaments spun through each spinneret 208a, 208b relative to other filaments spun from the same spinneret 208a, 208b may be the same or different. And, the denier per filament of the filaments spun through each spinneret 208a, 208b relative to the filaments spun from the other spinneret 208a, 208b may be the same or different.

In some implementations, there is a desire to maintain a constant throughput, or total volumetric flow rate, for each extruder. The total volumetric flow rate extruded from each extruder 202a-202c is the sum of the volumetric flow rates pumped by the spin pumps 204a1-204c2 that are paired with the respective extruder 202a-202c. For example, the total volumetric flow rate extruded from extruder 202a is the sum of the volumetric flow rates pumped by spin pumps 204a1 and 204a2. Similarly, the total volumetric flow rate extruded from the extruder 202b is the sum of the volumetric flow rates pumped by spin pumps 204b1 and 204b2. And, the total volumetric flow rate extruded from extruder 202c is the sum of the volumetric flow rates pumped by spin pumps 204c1 and 204c2. However, in other implementations, the volumetric flow rate of each pump that is paired with a particular extruder is not limited relative to the volumetric flow rate of the other pumps paired with that particular extruder.

The processor 210 is configured to execute computer readable instructions that cause the processor 210 to (1) adjust the volumetric flow rate of the thermoplastic polymers pumped from each spin pump 204a1-204c1 of the first group of spin pumps to achieve a first ratio of thermoplastic polymers to be included in the first bundle of filaments 214a spun from the first spinneret 208a of the first spin station 206a and (2) adjust the volumetric flow rate of the thermoplastic polymers pumped from each spin pump 204a2-204c2 of the second group of spin pumps to achieve a second ratio of the thermoplastic polymers to be included in the second bundle filaments 214b spun from the second spinneret 208b of the second spin station 206b. In some instances, the processor 210 and memory form a computer device such as that shown in FIG. 10, which is described below. FIG. 10 illustrates an example computing system that includes a processor, which can include processor 210. The system in FIG. 10 may be used by system 200, for example.

In some implementations, the ratio to be included in each of the bundles of filaments 214a, 214b are different.

The colors, hues, and/or dyability characteristics of the bundle of filaments 214a, 214b may include filaments having the color, hue, and/or dyability characteristic of the polymer in the first extruder 202a, filaments having the color, hue, and/or dyability characteristic of the polymer in the second extruder 202b, filaments having the color, hue, and/or dyability characteristic of the polymer in the third extruder 202c, and/or filaments having a color, hue, and/or dyability characteristic that is a mixture of the colors, hues, and/or dyability characteristics from the extruders 202a-202c.

The average denier of the bundle of filaments spun through each spinneret 208a, 208b is constant or does not vary more than ±5%. However, the average denier per filament of the filaments spun through the first spinneret 208a of the first spin station 206a may be different from the average denier per filament of the filaments spun through the second spinneret 208b of the second spin stations 206b.

In some implementations in which the system has at least three extruders, the thermoplastic polymer streams from at least two of the extruders are spun together but separately from the thermoplastic polymer stream from at least one other extruder. For example, FIG. 3A illustrates an implementation that is similar to FIG. 1, showing three extruders 302a-302c and three spin pumps 304a-304c, except that the spin station 306 includes two spinnerets 308a, 308b, two mixing plates 307a, 307b, and two manifolds 305a, 305b. However, in other implementations, the mixing plates can be one piece and/or the manifolds can be one piece. Thermoplastic polymer streams from extruders 302a and 302b are pumped into manifold 305a by pumps 304a, 304b, respectively, and are spun into filaments 314a through spinneret 308a. And, the thermoplastic polymer stream from extruder 302c is pumped into manifold 305b by pump 304c and is spun into filaments 314b through spinneret 308b. Therefore, the colors, hues, and/or dyability characteristics of the bundle of filaments 314a may include filaments having the color, hue, and/or dyability characteristic of the polymer in the first extruder 302a, filaments having the color, hue, and/or dyability characteristic of the polymer in the second extruder 302b, and/or filaments having a color, hue, and/or dyability characteristic that is a mixture of the colors, hues, and/or dyability characteristics from the extruders 202a-202b. Thus, the bundle of filaments 314a has a blended appearance based on the streams spun through spinneret 308a. And, the colors, hues, and/or dyability characteristics of the bundle of filaments 314b has filaments having the color, hue, and/or dyability characteristic of the polymer in the third extruder 302c.

According to some implementations, if the thermoplastic polymer from one extruder is not being mixed with a thermoplastic polymer from another extruder prior to spinning, such as the stream extruded from extruder 302c in FIG. 3A, the variation in the volumetric flow rate of the thermoplastic polymer displaced by the extruder may be based on, but is not limited to, the type of polymer, a size and/or shape of the capillaries of the spinneret, the temperature of the polymer, and the denier per filament of the filaments spun from that spinneret. The volumetric flow rate is greater than zero and can be varied such that the flow of the polymer stream through the spinneret is continuous and supports continuous filament formation.

In addition, the average denier of the yarn that is made with the bundles 314a, 314b can be kept substantially constant (e.g., ±5% variation) if the sum of volumetric flow rate of the pumps 304a and 304b remains substantially constant and if the volumetric flow rate of pump 304c remains substantially constant. However, changing the sum of the volumetric flow rate of pumps 304a and 304b or changing the volumetric flow rate displaced by pump 304c may change the average denier of the yarn.

The bundles 314a, 314b produced by system 300 in FIG. 3A can be drawn separately by drawing device 360, which is a plurality of godets, after the spinning process, assuming that the filaments in bundle 314b are not subject to breakage due to their denier per filament, radial cross-sectional shape, or otherwise. The drawing device 360 is at least one or more godets, for example, but in other implementations, it can also include a draw point localizer.

FIG. 3B illustrates a schematic diagram of optional post-spinning processes for the spinning system in FIG. 3A. These optional post-spinning processes enhance the color contributed to the yarn by each bundle of filaments 314a, 314b. Each process can be used when there are two or more spun filament bundles that have different colors and/or hues. The processes include (1) tacking spun filaments in at least one bundle separately from the other bundles after spinning and prior to or during the drawing process, (2) texturing tacked spun filaments in at least one bundle separately from the other bundles after the drawing process, and (3) tacking textured and tacked spun filaments in at least one bundle separately from the other bundles and feeding the bundles to a mixing cam that feeds the bundles to a final tacking device for tacking together the bundles into a yarn.

As shown in FIG. 3B, each bundle of spun filaments 314a, and 314b are tacked individually by a tacking device 315, 325, respectively. In other words, each bundle 314a, 314b is physically separated from the other bundle and only filaments belonging to the respective bundle are tacked together. The tacking devices 315, 325 are air entanglers. The tacking is done with air entangling every 6 to 155 mm (e.g., 20 to 50 mm). In addition, the tacking devices 315, 325 may use 2 to 6 bar pressure, but the pressure may increase with an increased number of filaments, increased denier per filament, and/or increased speed of filament production.

The tacking devices 315, 325 are air entanglers that use room temperature air for entangling the filaments. In other embodiments, the tacking devices include heated air entanglers (e.g., air temperature is higher than room temperature) or steam entanglers, for example.

The bundles of tacked filaments 316, 326 are drawn to the final titer by drawing device 360, which is a plurality of godets. The godets are each turned at a different speed, according to some embodiments. The draw ratio is typically 1.5 to 4.5. Each filament is drawn to a titer of 2 to 40 titer (or DPF). Two bundles of elongated spun filaments 317, 327 are provided after drawing.

When looking along the axial length of the yarn 391, the position of the filaments originating from bundles 314a, 314b are more pronounced in the yarn 391 than if the bundles of filaments 314a 314b had not been individually tacked with tacking devices 315, 325.

In alternative embodiments (not shown in FIG. 3B), air entanglement can be applied to one or more of the bundles by turning off or on air to 315, 325. In addition, in other embodiments, air can be applied constantly or in an on/off sequence to get the desired end effect.

And, in yet another embodiment (not shown in FIG. 3B), the bundles of spun filaments are first elongated partially before being tacked individually. After the tacking step, the spun, tacked bundles are further elongated to the final denier.

Next, to further enhance the color of each bundle within the yarn, each bundle of tacked and drawn filaments 317, 327 are texturized separately through texturizers 371, 372, respectively. Following this step, bundles 318, 328 of texturized filaments are provided.

The texturizers 371, 372 may apply air, steam, heat, mechanical force, or a combination of one of more of the above to the filaments to cause the filaments to bulk (or crimp/shrink). The bundles 317, 327 are texturized to have a bulk (or crimp or shrinkage) of 5-20%. Texturizing individual bundles of filaments separately, when using bundles with different colors and/or hues, provides a more pronounced color and/or hue along the axial length of the BCF yarn. The filaments that are texturized separately tend to stay more grouped together during the rest of the production steps to make the BCF yarn, which results in the color and/or hue of this bundle of spun filaments being more pronounced along the length of the BCF yarn.

Next, the texturized filaments 318, 328 are provided to an individual color entanglement process prior to the final tacking at tacking device 380. In this individual color entanglement process, the bundles 318, 328 of texturized filaments are fed into separate tacking devices 319, 329 to tack individually each bundle of texturized spun filaments.

Tacking devices 319, 329 are air entanglers that use room temperature air applied at 2 bar to 6 bar pressure, for example, for entangling the filaments every 15 to 155 mm. But the pressure may increase with an increased number of filaments, increased denier per filament, and/or increased speed of filament production. And, in other embodiments, the tacking devices 319, 329 include heated air entanglers (e.g., air temperature is higher than room temperature) or steam entanglers, for example. The tacking may be done more frequently for a specific look desired. For example, with more frequent tacking, the yarn looks less bulky and the color separation is reduced, which results in a more blended look for the colors.

After being individually tacked with tacking devices 319, 329, the bundles 320, 321 are guided to a mixing cam 400. The mixing cam 400 positions bundles tacked by tacking devices 319, 329 relative to each other prior to being tacked together in final tacking device 380. The mixing cam 400 is cylindrical and has an external surface defining a plurality of grooves for receiving and guiding the texturized and tacked bundles.

The mixing cam 400 is rotatable about its central axis or can be held stationary. If rotated, the mixing cam 400 varies which side of the bundles are presented to the tacking jet in the tacking device 380, which affects how the bundles (and filaments therein) are layered relative to each other. In some embodiments, the positions are randomly varied. The speed of rotation can be changed to provide a different appearance in the yarn 391. For example, one or more of the bundles 320, 321 may have a first color on one side of the bundle 320, 321 and a second color on another side of the bundle 320, 321, wherein the sides of the bundle are circumferentially spaced apart but intersected by the same radial plane. It may be desired to have the first color on an exterior facing surface of an arc in a carpet loop in one area of the carpet and the second color on an exterior facing surface of an arc in a carpet loop in another area of the carpet. Rotating the cam 400 may "flip" one or more of the bundles 320, 321 about its axis such that the desired color is oriented on a portion of the outer surface of the yarn 391 such that the desired color is on the exterior facing surface of the arc in the carpet loop. The undesired color for that portion of the carpet is hidden on the inside facing surface of the loop. Rotation of the cam 400 ensures that the filaments that run on the outside of the loop are changing due to a specific mechanical means and not necessarily natural occurrences in downstream processes.

When stationary, the positions of the bundles 320, 321 are directed by the mixing cam 400 to the final tacking device 380 but their relative positions are not varied. In alternative embodiments, the bundles 320, 321 are fed to the tacking device 380 directly or they are fed via a stationary guide disposed between the intermediate tacking devices 319, 329 and the tacking device 380.

The tacked texturized bundles 320, 321 positioned by mixing cam 400 are thereafter tacked together by tacking device 380 into a BCF yarn 391. This tacking is done with air entangling every 12 to 80 mm.

Tacking device 380 is an air entangler that uses room temperature air applied at 2 bar to 6 bar pressure, for example, for entangling the filaments. But the pressure may increase with an increased number of filaments, increased denier per filament, and/or increased speed of filament production. And, in other embodiments, the tacking device 380 includes heated air entanglers (e.g., air temperature is higher than room temperature) or steam entanglers, for example. The bundles 320, 321 are tacked and as such provide a BCF yarn 391 comprising an average of 24-360 filaments of 2 to 40 DPF each. The tacking may be done more frequently for a specific look desired. For example, with more frequent tacking, the yarn looks less bulky and the color separation is reduced, which results in a more blended look for the colors.

The effect of this individual tacking and guidance via a mixing cam cause the colors and/or hues in the yarn to be more structured and positioned. When such yarn is used as for example, a tufting yarn in a tufted carpet, the positioning of the colored bundles in the yarn cause bundles to be more pronounced in the final carpet surface. The positioning of the color and/or hue in the BCF yarn has as effect that this color and/or hue can be locally more present on the top side of the tuft oriented upwards, away from the backing of the carpet, or hidden at the low side of the tuft oriented towards the backing of the carpet. The effect is the provision of very vivid and pronounced color zones on the carpet.

In the implementations of FIGS. 1-3B, each mixing plate 107, 207a, 207b, 307a, 307b defines a single channel that receives all of the molten thermoplastic polymer streams that flow through the respective manifold 105, 205a, 205b, 305a, 305b that is upstream of the mixing plate 107, 207a, 207b, 307a, 307b. In other words, the mixing plates 107, 207a, 207b, 307a, 307b are not separating the molten thermoplastic polymer streams before the streams flow through the spinnerets 108, 208a, 208b, 308a, 308b. However, in other implementations, the mixing plate may include a plurality of channels for separating or mixing a plurality of molten thermoplastic polymer streams. FIGS. 4A-4D illustrate a mixing plate 865 having two channels 865a, 865b defined by the plate 865 that receives molten thermoplastic polymer streams from the manifold 800 upstream from the mixing plate 865. Each channel 865a, 865b feeds separate spinnerets. Thus, if two or more molten thermoplastic polymer streams are received into one of the channels 865a, 865b, the two or more streams are at least partially mixed in the respective channel 865a, 865b.

Like FIGS. 4A-4D, FIG. 5 illustrates a system 500 that includes a mixing plate 507 defining two channels 507a, 507b therethrough. The mixing plate 507 is disposed between a static manifold 505 and spinneret 508. The molten thermoplastic polymer stream from extruder 502a is pumped by pump 504a into the manifold 505, which feeds the stream into channel 507a of the mixing plate, which feeds the stream through spinneret 508. The molten thermoplastic polymer streams from extruders 502b, 502c are pumped by pumps 504b, 504c, respectively, into the manifold 505, which feeds the streams into channel 507b of the mixing plate, which feeds the streams through spinneret 508. Thus, the stream from extruder 502a is not mixed or spun together with the streams from extruders 502b, 502c in the manifold 505 or the mixing plate 507, but the streams from extruders 502b, 502c are at least partially mixed in the channel 507b prior to being spun through the spinneret 508.

In some embodiments of any of the first through seventh aspects, the DPF of the filaments in each of the bundles are equal. However, in other embodiments, at least some of the filaments in one bundle may have a different DPF than the other filaments in the bundle. Or, in some embodiments, the filaments in one bundle may have the same DPF as other filaments in the bundle but the DPF of those filaments may be different from the DPF of the filaments in another bundle. And, in some embodiments, the number of filaments in the bundles are equal. And, in other embodiments, the number of filaments in each bundle may differ.

EXAMPLES

Figure 6:
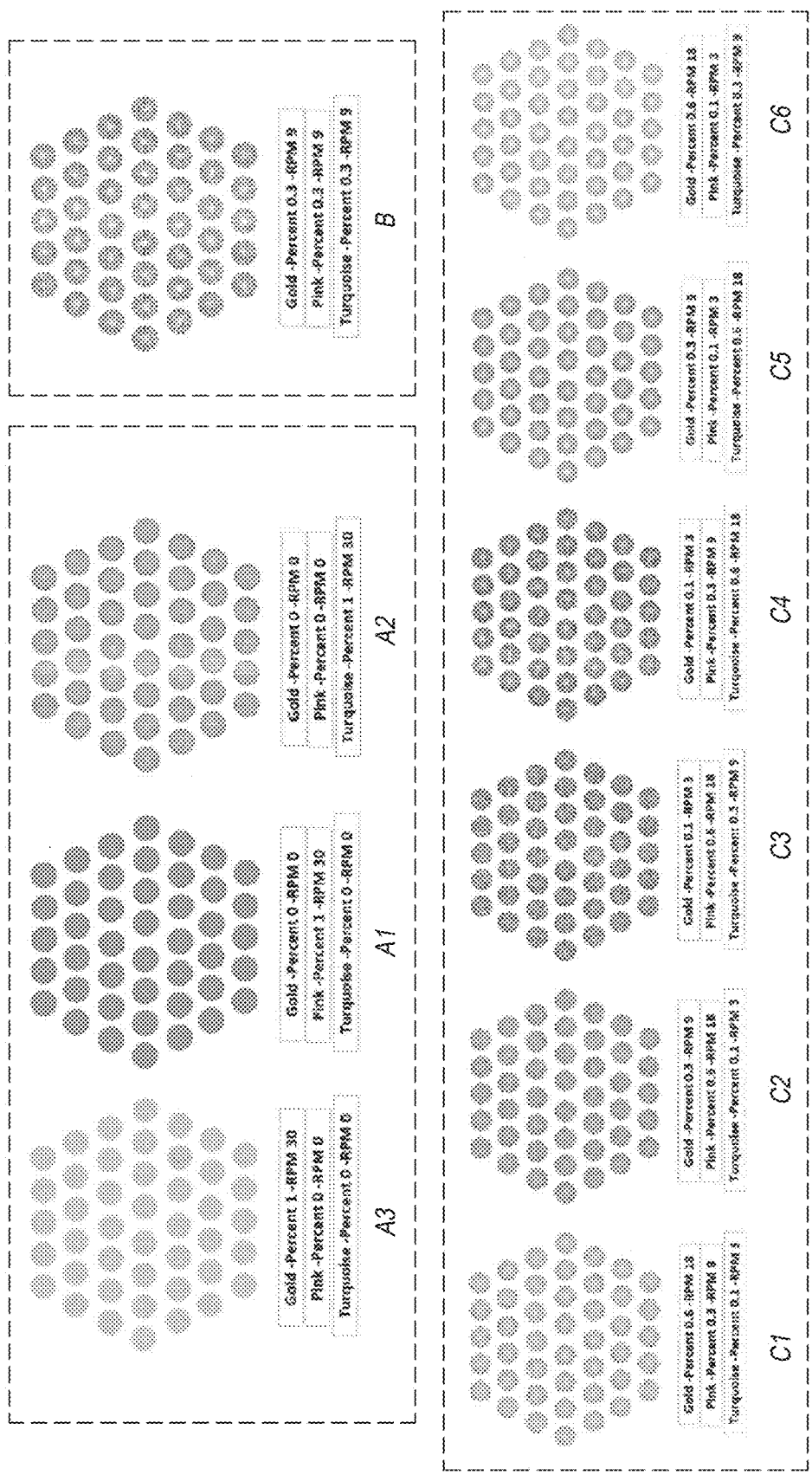
FIG. 6 illustrates results of color sequencing testing by operating the pumps in FIG. 1 at different speeds to change the color of the filaments, according to one implementation.

FIG. 6 illustrates the results of a color sequencing test using the system 100 shown in FIG. 1. For this test, extruder 102a had magenta molten Nylon, extruder 102b had cyan molten Nylon, and extruder 102c had yellow molten Nylon. The pumps 104a, 104b, 104c were operated at the same or different RPMs to change the color of the filaments 114. The filament colors changed in response to the RPM changes in less than 10 seconds. For example, when pump 104a was operated at full capacity (e.g., 30 RPM) and pumps 104b and 104c were stopped (0 RPM), the filaments 114 were magenta, as shown in A1. When pump 104b was operated at full capacity (e.g., 30 RPM) and pumps 104a and 104c were stopped (0 RPM), the filaments 114 were cyan, as shown in A2. And, when pump 104c was operated at full capacity (e.g., 30 RPM) and pumps 104a and 104b were stopped (0 RPM), the filaments 114 were yellow, as shown in A3. When each three pumps 104a, 104b, 104c were operated at 30% capacity (e.g., 9 RPM each), the filaments 114 were a blended mixture of the three colors, as shown in B. When pump 104c was operated at 60% of full capacity (e.g., 18 RPM), the pump 104a was operated at 30% capacity (e.g., 9 RPM), and the pump 104b was operated at 10% capacity (e.g., 3 RPM), the filaments 114 were a blended mixture of the three colors, as shown in C1. When pump 104b was operated at 60% of full capacity (e.g., 18 RPM), the pump 104c was operated at 30% capacity (e.g., 9 RPM), and the pump 104c was operated at 10% capacity (e.g., 3 RPM), the filaments 114 were a blended mixture of the three colors, as shown in C2. When pump 104a was operated at 60% of full capacity (e.g., 18 RPM), the pump 104b was operated at 30% capacity (e.g., 9 RPM), and the pump 104c was operated at 10% capacity (e.g., 3 RPM), the filaments 114 were a blended mixture of the three colors, as shown in C3. When pump 104b was operated at 60% of full capacity (e.g., 18 RPM), the pump 104a was operated at 30% capacity (e.g., 9 RPM), and the pump 104c was operated at 10% capacity (e.g., 3 RPM), the filaments 114 were a blended mixture of the three colors, as shown in C4. When pump 104b was operated at 60% of full capacity (e.g., 18 RPM), the pump 104c was operated at 30% capacity (e.g., 9 RPM), and the pump 104a was operated at 10% capacity (e.g., 3 RPM), the filaments 114 were a blended mixture of the three colors, as shown in C5. And, when pump 104c was operated at 60% of full capacity (e.g., 18 RPM), the pump 104b was operated at 30% capacity (e.g., 9 RPM), and the pump 104a was operated at 10% capacity (e.g., 3 RPM), the filaments 114 were a blended mixture of the three colors, as shown in C6.

Figure 7A:
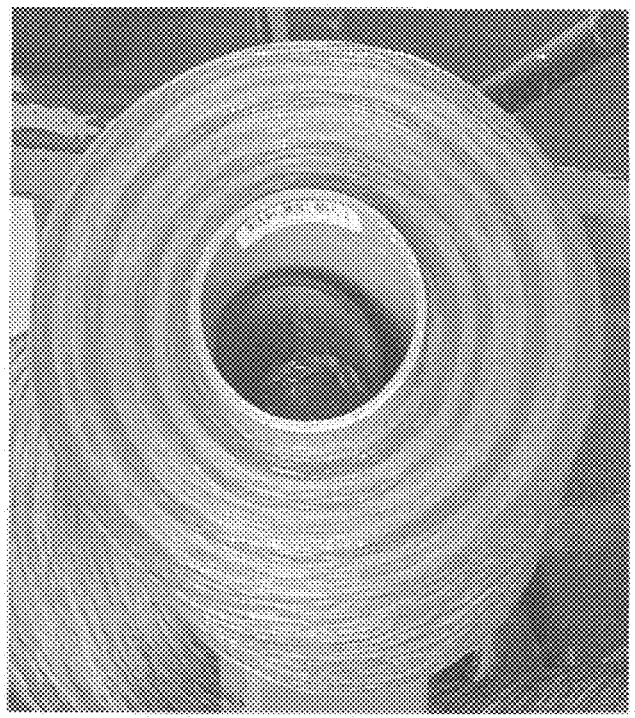
FIG. 7A illustrates a roll of BCF yarn produced by spinning each color of thermoplastic polymer individually but adjusting the pumps for each color to yield different colors, according to one implementation.
Figure 7B:
FIG. 7B illustrates a roll of BCF yarn produced by using the system of FIG. 1 and the color sequencing described in relation to FIG. 6 for sequences C1-C6, according to one implementation.
Figure 8:
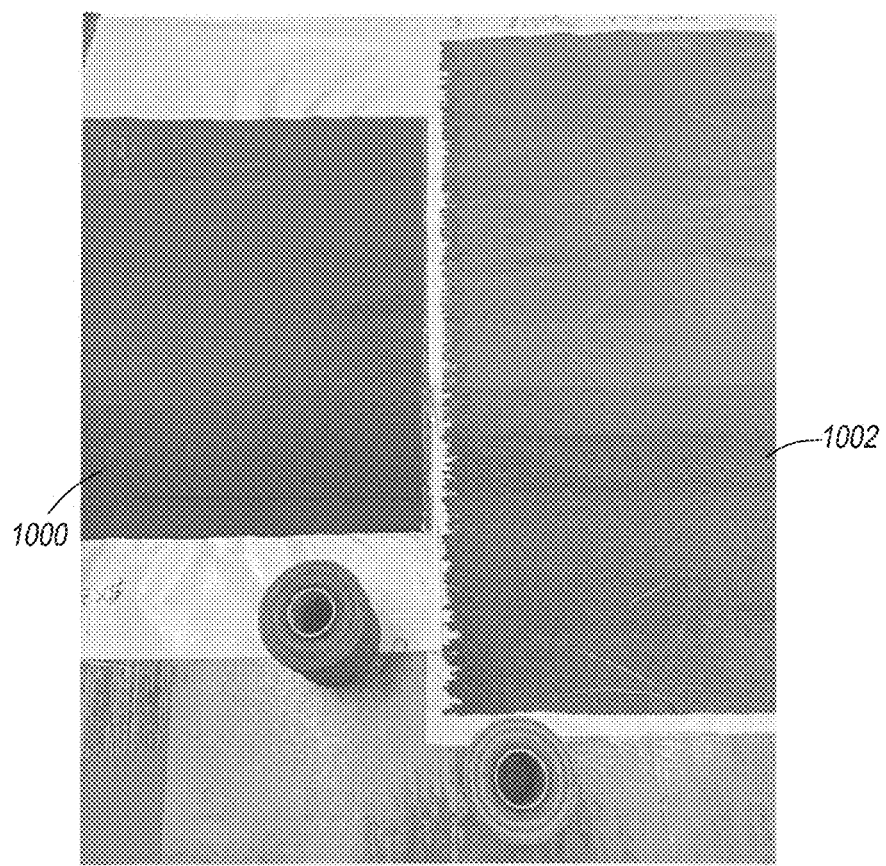
FIG. 8 illustrates a comparison of carpets having piles made from the BCF yarns shown in FIGS. 7A and 7B.

FIG. 7B illustrates rolls of yarn produced using the system of FIG. 1. As can be seen, the color of the yarn varies over the length of the yarn, due to the color sequencing changes described above in in relation to FIG. 6 and shown in C1-C6. However, the color is more blended than the yarn shown in FIG. 7A. The yarn in FIG. 7A is made using the same polymers having the same colors as are used in the yarn of FIG. 7B and by adjusting the pump output to adjust the color of the yarn, but the molten Nylon streams from each extruder are spun separately from each other through separate spinnerets. Thus, by spinning more than one polymer stream together, the yarn has a more blended color. And, FIG. 8 illustrates carpets 1000, 1002 that have pile made with the BCF yarns shown in FIGS. 7B and 7A, respectively.

Figure 9:
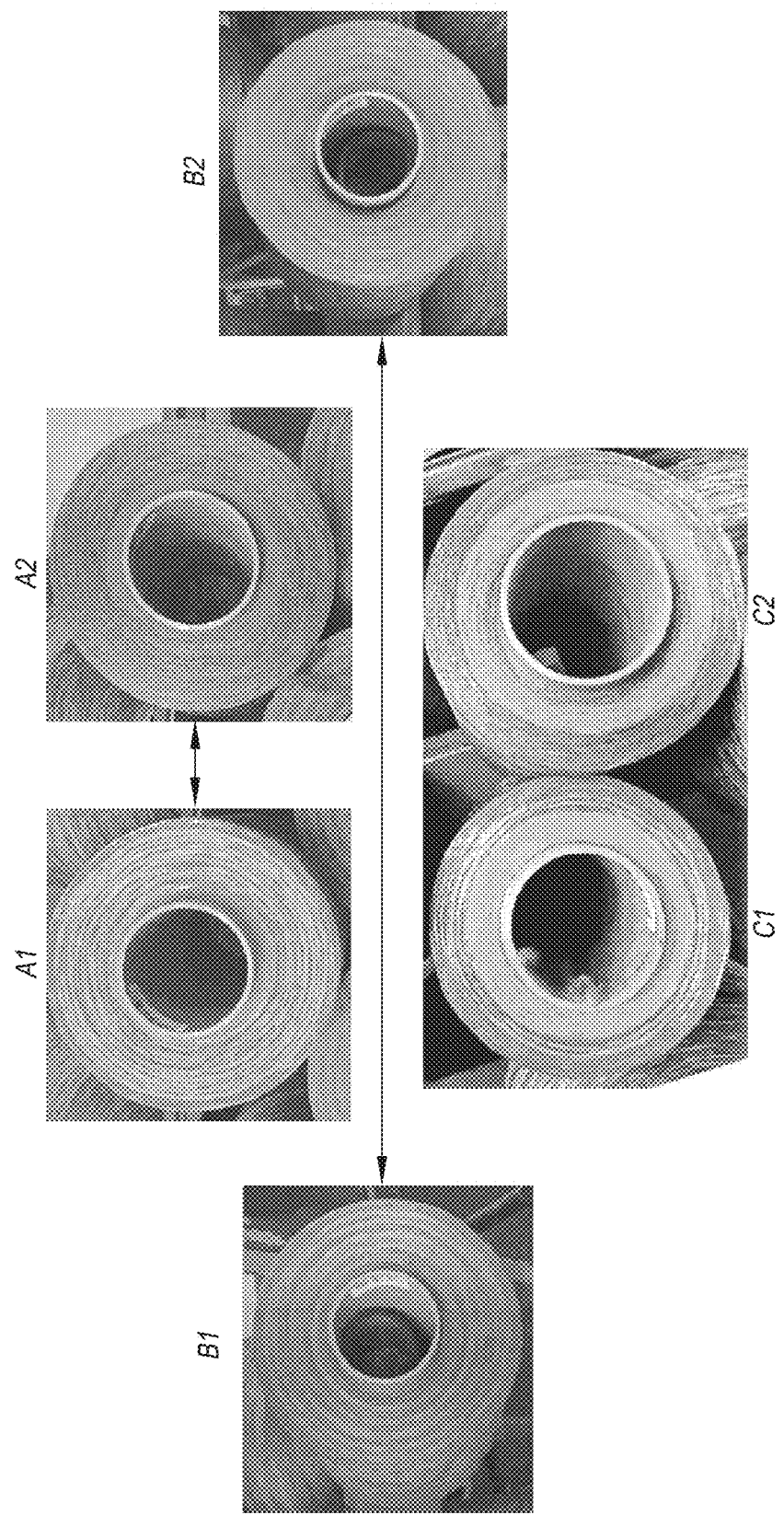
FIG. 9 illustrates a comparison of rolls of BCF yarn produced according to the system described in relation to FIG. 7A and FIG. 1 and according to various pump speed ratios.

FIG. 9 illustrates a comparison of rolls of BCF yarn made according to the system described above in relation to FIG. 7A (marked A1, B1, C1) with those made with the system of FIG. 1 (marked A2, B2, C2) and according to different pump speed ratios. For example, in one comparison (A1-A2), the pump ratio is 10:4:1 (e.g., the speeds for the pumps for each extruder are varied to be 20:8:2 RPM). In another comparison (B1-B2), the pump ratio is 6:3:1 (e.g., the speeds for the pumps for each extruder are varied to be 18:9:3 RPM). And, in another comparison (C1-C2), the pump ratio is 4:1:1 (e.g., the speeds for the pumps for each extruder are 20:5:5 RPM).

It is remarked that where notice is made of different or varying colors or hue, at least a color or hue difference as expressed with a Delta E value of 1.0 is preferred. Even better the difference or variation at least encompasses a color or hue difference as expressed by Delta E of at least 5.0 or at least 10.0. Delta E is a measure of change in visual perception of two given colors.

FIG. 10 illustrates an example computing device that can be used for controlling the pumps of the system 100. As used herein, "computing device" or "computer" may include a plurality of computers. The computers may include one or more hardware components such as, for example, a processor 1021, a random access memory (RAM) module 1022, a read-only memory (ROM) module 1023, a storage 1024, a database 1025, one or more input/output (I/O) devices 1026, and an interface 1027. All of the hardware components listed above may not be necessary to practice the methods described herein. Alternatively and/or additionally, the computer may include one or more software components such as, for example, a computer-readable medium including computer executable instructions for performing a method associated with the example embodiments. It is contemplated that one or more of the hardware components listed above may be implemented using software. For example, storage 1024 may include a software partition associated with one or more other hardware components. It is understood that the components listed above are examples only and not intended to be limiting.

Processor 1021 may include one or more processors, each configured to execute instructions and process data to perform one or more functions associated with a computer for producing at least one bundle of filaments and/or at least one yarn. Processor 1021 may be communicatively coupled to RAM 1022, ROM 1023, storage 1024, database 1025, I/O devices 1026, and interface 1027. Processor 1021 may be configured to execute sequences of computer program instructions to perform various processes. The computer program instructions may be loaded into RAM 1022 for execution by processor 1021.

RAM 1022 and ROM 1023 may each include one or more devices for storing information associated with operation of processor 1021. For example, ROM 1023 may include a memory device configured to access and store information associated with the computer, including information for identifying, initializing, and monitoring the operation of one or more components and subsystems. RAM 1022 may include a memory device for storing data associated with one or more operations of processor 1021. For example, ROM 1023 may load instructions into RAM 1022 for execution by processor 1021.

Storage 1024 may include any type of mass storage device configured to store information that processor 1021 may need to perform processes consistent with the disclosed embodiments. For example, storage 1024 may include one or more magnetic and/or optical disk devices, such as hard drives, CD-ROMs, DVD-ROMs, or any other type of mass media device.

Database 1025 may include one or more software and/or hardware components that cooperate to store, organize, sort, filter, and/or arrange data used by the computer and/or processor 1021. For example, database 1025 may store computer readable instructions that cause the processor 1021 to adjust the volumetric flow rate of the thermoplastic polymers pumped by each spin pump to achieve a ratio of the thermoplastic polymers to be included in the filaments spun from the at least one spinneret. It is contemplated that database 1025 may store additional and/or different information than that listed above.

I/O devices 1026 may include one or more components configured to communicate information with a user associated with computer. For example, I/O devices may include a console with an integrated keyboard and mouse to allow a user to maintain a database of digital images, results of the analysis of the digital images, metrics, and the like. I/O devices 1026 may also include a display including a graphical user interface (GUI) for outputting information on a monitor. I/O devices 1026 may also include peripheral devices such as, for example, a printer for printing information associated with the computer, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 1027 may include one or more components configured to transmit and receive data via a communication network, such as the Internet, a local area network, a workstation peer-to-peer network, a direct link network, a wireless network, or any other suitable communication platform. For example, interface 1027 may include one or more modulators, demodulators, multiplexers, demultiplexers, network communication devices, wireless devices, antennas, modems, and any other type of device configured to enable data communication via a communication network.

Various implementations have been described. Nevertheless, it will be understood that various modifications may be made without departing from the spirit and scope of the description. Accordingly, other implementations are within the scope of the following claims.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

The terminology used herein is for the purpose of describing particular implementations only and is not intended to be limiting of the disclosure. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention claimed is:

1. A system for producing at least one bundle of filaments, the system comprising:

N extruders, wherein N is an integer greater than 1, each extruder comprising a thermoplastic polymer having a color, hue, and/or dyability characteristic, the colors, hues, and/or dyability characteristics of the thermoplastic polymers in the N extruders being different from each other; and at least one spin station for receiving molten thermoplastic polymer streams from the N extruders and producing the at least one bundle of filaments, the spin station comprising:

at least one dynamic manifold, wherein the dynamic manifold comprises N inlets and at least N+1 outlets, wherein each inlet is in fluid communication with a respective one of the N extruders, and at least one inlet of the N inlets is in communication with at least two outlets of the at least N+1 outlets via channels that extend between the inlet of the at least one inlet and the outlets of the at least two outlets and comprises at least one valve that controls flow of the polymer stream between the at least one inlet and the at least two outlets;

at least one spinneret through which a plurality of melt-spun filaments are spun from at least two of the molten thermoplastic polymer streams received by the spin station, wherein a first molten thermoplastic polymer stream of the at least two molten thermoplastic polymer streams is received from one of the at least two outlets of the dynamic manifold; and a group of N spin pumps upstream of the dynamic manifold, wherein each spin pump is in fluid communication and is paired with one of the N extruders; and a processor in electrical communication with the N spin pumps, the processor being configured to execute computer readable instructions that cause the processor to adjust a volumetric flow rate of the thermoplastic polymers pumped by each spin pump to achieve a ratio of the thermoplastic polymers to be included in a yarn comprising the filaments spun from the at least one spinneret.

2. The system of claim 1, wherein the instructions further cause the processor to determine the volumetric flow rate of each thermoplastic polymer to be pumped by each spin pump.

3. The system of claim 2, wherein the instructions further cause the processor to determine an amount of time during which the determined volumetric flow rate of each thermoplastic polymer is pumped by each spin pump.

4. The system of claim 3, wherein the instructions further cause the processor to randomly vary the amount of time during which the determined volumetric flow rate of each thermoplastic polymer is pumped by each spin pump.

5. The system of claim 1, wherein the spin station is a first spin station, the group of N spin pumps being a first group of N spin pumps and the system further comprises a second spin station and a second group of N spin pumps upstream of the dynamic manifold, wherein each spin pump of this second group of spin pumps is in fluid communication and is paired with one of the N extruders, wherein:
- the ratio is a first ratio for the first spin station, and
- the instructions further cause the processor to adjust the volumetric flow rate of the thermoplastic polymers pumped from each spin pump of this second group of spin pumps to achieve a second ratio of the thermoplastic polymers to be included in the filaments spun from the spinneret of the second spin station.

6. The system of claim 1, wherein the system comprises M spin stations and M groups of N spin pumps upstream of the at least one spinneret for each of the M spin stations, wherein each spin pump of each of the M groups of spin pumps is in fluid communication and is paired with one of the N extruders, wherein M is an integer greater than one, and wherein:
- the instructions further cause the processor to adjust the volumetric flow rate of the thermoplastic polymers pumped from each spin pump of each of the M groups of spin pumps to achieve M ratios of the thermoplastic polymers to be included in the filaments spun from the at least one spinneret of each M spin station.

7. The system of claim 1, wherein:
- the filaments spun from the at least one spinneret include at least a first group of filaments and a second group of filaments,
- the first group of filaments have a first color, hue, and/or dyability characteristic, the first group of filaments being extruded from a first of the N extruders, and
- the second group of the filaments have a second color, hue, and/or dyability characteristic, the second group of filaments being extruded from a second of the N extruders.

8. The system of claim 7, wherein: the filaments spun from the at least one spinneret further include a third group of filaments, the third group of the filaments have a third color, hue, and/or dyability characteristic, wherein the third color, hue, and/or dyability characteristic is a mixture of the first color, hue, and/or dyability characteristic and the second color, hue, and/or dyability characteristic.

9. The system of claim 7, wherein an average denier per filament of each group of filaments is substantially constant wherein it does not vary by more than ±5% along a length of each filament.

10. The system of claim 1, further comprising:
- at least one drawing device to elongate said at least one bundle of spun filaments;
- an initial tacking device upstream to or integrated within the at least one drawing device to tack at least one of said at least one bundle of spun filaments prior to or during the elongation of the at least one bundle of spun filaments;
- at least one texturizer to texturize said at least one bundle of elongated spun filaments; and
- a final tacking device to tack said at least one bundle of texturized spun filaments to provide a BCF yarn.

11. The system of claim 1, further comprising:
- at least one drawing device to elongate said at least one bundle of spun filaments;
- at least a first texturizer and a second texturizer, wherein at least one of said at least one bundle of elongated spun filaments is texturized individually through the first texturizer separately from the other said at least one bundle of elongated spun filaments; and
- a final tacking device to tack said at least one bundle of texturized spun filaments to provide a BCF yarn.

12. The system of claim 1, further comprising:
- at least one drawing device to elongate said at least one bundle of spun filaments;
- at least one texturizer to texturize said at least one bundle of elongated spun filaments;
- a tacking device disposed between the at least one texturizer and a final tacking device, the tacking device for tacking at least one of said at least one bundle of texturized spun filaments; and
- the final tacking device to tack said at least one bundle of texturized spun filaments to provide a BCF yarn.

\* \* \* \* \*